US011120361B1

(12) United States Patent
Januschowski et al.

(10) Patent No.: US 11,120,361 B1
(45) Date of Patent: Sep. 14, 2021

(54) TRAINING DATA ROUTING AND PREDICTION ENSEMBLING AT TIME SERIES PREDICTION SYSTEM

(71) Applicant: Amazon Technologies, Inc., Seattle, WA (US)

(72) Inventors: Tim Januschowski, Berlin (DE); Joos-Hendrik Boese, Berlin (DE); Jan Alexander Gasthaus, Berlin (DE); Sebastian Schelter, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 1043 days.

(21) Appl. No.: 15/441,924

(22) Filed: Feb. 24, 2017

(51) Int. Cl.
G06N 20/00 (2019.01)
G06N 7/00 (2006.01)

(52) U.S. Cl.
CPC ............ G06N 20/00 (2019.01); G06N 7/005 (2013.01)

(58) Field of Classification Search
CPC ........ G06N 20/00; G06N 20/20; G06N 7/005; G06N 5/003; G06Q 10/04; G06Q 30/0202
See application file for complete search history.

(56) References Cited

U.S. PATENT DOCUMENTS

| 5,815,413 | A | 9/1998 | Hively et al. |
| 7,124,055 | B2 | 10/2006 | Breiman |
| 7,480,640 | B1 * | 1/2009 | Elad .................. G06Q 10/10 706/14 |
| 7,490,287 | B2 | 2/2009 | Sakurai |
| 2006/0217939 | A1 | 9/2006 | Nakata et al. |
| 2012/0016816 | A1 | 1/2012 | Yanase et al. |
| 2012/0023045 | A1 | 1/2012 | Steck |
| 2014/0372346 | A1 * | 12/2014 | Phillipps ............. G06N 20/00 706/12 |
| 2015/0134413 | A1 * | 5/2015 | Deshpande ....... G06Q 30/0202 705/7.31 |
| 2017/0132509 | A1 | 5/2017 | Li et al. |
| 2018/0060744 | A1 * | 3/2018 | Achin ................ G06N 20/00 |

OTHER PUBLICATIONS

Kumar et al., Model Selection Management Systems: The Next Frontier of Advanced Analytics, ACM SIGMOD, Record 44.4, 2016, pp. 17-22. (Year: 2016).*
http://www.bearcave.com/finance/random_r_hacks/kalman_smooth.html, "Smoothing a Time Series with a Kalman Filter in R", 2013, pp. 1-4.
Nesreen K. Ahmed, et al., "An Empirical Comparison of Machine Learning Models for Time Series Forecasting", Taylor & Francis, Online publication date Sep. 15, 2010, pp. 594-621.

(Continued)

*Primary Examiner* — Kamran Afshar
*Assistant Examiner* — Marshall L Werner
(74) *Attorney, Agent, or Firm* — Robert C. Kowert; Kowert, Hood, Munyon, Rankin & Goetzel, P.C.

(57) ABSTRACT

An input data set with a plurality of item descriptors comprising respective time series observations is identified. A routing directive indicating a predicate to be evaluated to determine whether a particular item descriptor is to be included in a training data set for a first learning algorithm is obtained. A plurality of learning algorithms are trained using training data sets derived from the input data set according to respective routing directives, and the trained algorithms are stored.

22 Claims, 21 Drawing Sheets

(56) References Cited

OTHER PUBLICATIONS http://www.mathworks.com/help/ident/ug/estimating-state-space-time-series-models.html, "Estimate StateSpace TimeSeries Models", Download Jan. 25, 2015; pp. 1-2.
http://www.eviews.com/Learning/index.html, "EViews Tutorials", Downloaded Feb. 4, 2015, pp. 1-2.
https://www.estima.com/ratsmain.shtml. "Product Information RATS: Introduction", Estima, Updated Feb. 4, 2015, pp. 1-2.
Siem Jan Koopman, et al., "Statistical algorithms for models in state space using SsfPack 2.2", Econometrics Journal, 1999, pp. 107-160, vol. 2.
Eric Zivot, "State Space Models and the Kalman Filter", Apr. 9, 2006, pp. 1-8.
David Sheung Chi Fung, "Methods for the Estimation of Missing Values in Time Series", Edith Cowan University, 2006, pp. 1-202.
Giovanni Petris, "An R Package for Dynamic Linear Models", Journal of Statistical Software, Oct. 2010, pp. 1-16, vol. 36, Issue 12.
Giovanni Petris, et al., "State Space Models in R", Journal of Statistical Software, May 2011, pp. 1-25, vol. 41, Issue 4.
William R. Bell, "REGCMPNT { A Fortran Program for Regression Models with ARIMA Component Errors", Journal of Statistical Software, May 2011, pp. 1-23, vol. 41, Issue 7.
http://www.mathworks.com/help/ident/ug/whatarestatespacemodels.html, "What Are State-Space Models?", Downloaded Jan. 25, 2015, pp. 1-2.
Eric Zivot, et al., "Time Series Forecasting with State Space Models", University of Washington, Department of Applied Mathematics, 2012, pp. 1-90.
Sy Lvain Arlot, et al., "A survey of cross-validation procedures for model selection", Statistics Surveys, 2010, pp. 4:40-79, vol. 4.
C.K. Chu, et al. "Comparison of Two Bandwidth Selectors with Dependent Errors", The Annal of Statistics, 1991. pp. 1906-1918, vol. 19, No. 4.
Hirotugu Akaike. "Fitting Autoregressive Models for Prediction", Annals of the institute of Statistical Mathematics, 1969, p. 243-247, 21(1).
Petar M. Djuric, et al., "Order Selection of Autoregressive Models", IEEE, Nov. 1992, pp. 2829-2833, vol. 40, No. 11.
Ciprian Doru Giurcaneanu, et al., "Estimation of AR and ARMA models by stochastic complexity", Lecture Notes-Monograph Series, 2006, pp. 48-59, vol. 52.
Konstantinos Konstantinides, "Threshold Bounds in SVD and a New Iterative Algorithm for Order Selection in AR Models", IEEE Transactions on signal processing, 1991, pp. 1218-1221.
Clifford M. Hurvich, et al., "Regression and Time Series Model Selection in Small Samples", Biometrika, Jun. 1989, pp. 297-307, vol. 76, No. 2.
Tetiana Stadnyiska, et al., "Comparison of automated procedures for ARMA model identification", Behavior Research Methods, 2008, pp. 250-262, vol. 40 No. 1.
Rob J. Hundman, et al., "Automatic time series forecasting: the forecast package for R", Monash, University, Department of Econometrics and Business Statistics, Jun. 2007, pp. 1-29.
Robert H. Shumway, et al., "Time Series Analysis and Its Applications With R Examples", Springer Science & Business Media, 2010, 1-171; 559-576.
G. Gardner, et al., "Algorithm AS 154: An Algorithm for Exact Maximum Likelihood Estimation of Autoregressive-Moving Average Models by Means of Kalman Filtering", Applied Statistics, 1980, pp. 311-322, vol. 29, Issue 3.
David S. Stoffer, et al., "Bookstrapping State-Space Models: Gaussian Maximum Likelihood Estimation and the Kalman Filter", Journal of the American Statistical Association, 1991, pp. 1024-1033, vol. 86, No. 416.
Andrew C, Harvey, et al., "Diagnostic Checking of Unobserved-Components Time Series Models", Journal of Business & Economic Statistics, Oct. 1992, pp. 377-389, vol. 10, No. 4.
Giovanni Petris, et al., "Dynamic Linear Models with R", Springer, May 2009, pp. 31-32.
Hui Zou, et al., "Regularization and variable selection via the elastic net", Journal of the Royal Statistical, Dec. 2003, pp. 301-320.
Andrew Harvey, "Forecasting with Unobserved Components Time Series Models", Handbook of Economic Forecasting, 2006, pp. 1-89.
James Durbin, et al., "Time Series Analysis by State Space Methods", Oxford University Press, May 2012, pp. 1-9.
Leonard J. Tashman, "Out-of-sample tests of forecasting accuracy: an analysis and review", International Journal of Forecasting, 2000, pp. 437-450, vol. 16, No. 4.
J. Rissanen, "Modeling By Shortest Data Description", Automatica, 1978, pp. 465-471, vol. 14, No. 5.
Mati Wax, "Order Selection for AR Models by Predictive Least Squares", IEEE Transactions on Acoustics, Speech, and Signal Processing, Apr. 1988, pp. 581-588, vol. 36, No. 4.
James R. Dickie, et al., "A comparative study of AR order selection methods", Signal Processing, Jan. 13, 1994, pp. 239-255, vol. 40, No. 2.
Piet De Jong, "The likelihood for a state space model", Biometrika, 1988, pp. 165-169, vol. 75, No. 1.
Robert Kohn, et al., "Estimation, Prediction, and Interpolation for ARIMA Models With Missing Data", Journal of the American Statistical Association, Sep. 1986, pp. 751-761, vol. 81, No. 395.
U.S. Appl. No. 15/417,070, filed Jan. 26, 2017, Valentin Flunked et al.
Texts: Online, Open-Access Textbooks, "7.1 Simple exponential smoothing," Rob J. Hyndman and George Athanasopoulos, downloaded from https://www.otexts.org/fpp/7/1 on Mar. 14, 2016, pp. 1-11.
Amazon webservices, "Amazon Machine Learning," Developer Guide, Latest Version, API Version Apr. 9, 2015, Last documentation update Mar. 21, 2016, pp. 1-143.
Benglo, et al., Google Research, Scheduled Sampling for Sequence Prediction with Recurrent Neural Networks, Sep. 23, 2015, pp. 1-9.
Sutskever, et al. "Sequence to Sequence Learning with Neural Networks," Submitted on Sep. 10, 2014 (v1), last revised Dec. 14, 2014 (this version, v3), pp. 1-9.
Ahmed, Nesreen K., et al., Publisher Taylor & Francis, "An Empirical Comparison of Machine Learning Models for Time Series Forecasting," Sep. 15, 2010, pp. 1-29.
Qingzheng xu, "A Review of Croston's method for intermittent demand forecasting," Jan. 1012, IEEE, pp. 468-472.
Nicolas Chapados, "Effective Bayesian Modeling of Groups of Related Count Time Series," Proceedings of the 31st International Conference on Machine Learning, Beijing, China, 2014. JMLR: W&CP vol. 32. Copyright 2014 by the author(s), pp. 1-9.
Research Program on Forecasting, "Forecasting the Intermittent Demand for Slow-Moving Items," Snyder, et al., Original Working Paper: May 18, 2010; Revised: Mar. 11, 2011, pp. 1-39. RPF Working Paper No. 2010-003, http://www.gwu.edu/~forcpgm/2010-003.pdf.
Christopher M. Bishop, Pattern Recognition and Machine Learning, 2002-2006, Springer 2006, First printing, pp. 1-82, More Info at http://research.microsoft.com/~cmbishop/PRML.
U.S. Appl. No. 15/153,713, filed May 12, 2016, Matthias Seeger et al.
Springer, "Forecasting with Exponential Smoothying; The State Space Approach," Aamazon.com, Hyndman, Koehler and Snyder, 2008, pp. 1-4.
Rasmus Baath's Research Blog, "Easy Laplace Approximation of Bayesian Models in R—Publishable Stuff," Nov. 22, 2013, downloaded from http://www.sumsar.net/blog/2013/11/easylaplaceapproximation/, pp. 1-16.
U.S. Appl. No. 14/662,021, filed Mar. 18, 2015, Gregory Michael Duncan et al.
Xiangrui Meng, et al., "MLlib: Machine Learning in Apache Spark", Journal of Machine Learning Research 17, 2016, pp. 1-7.
Martin Jaggi, et al., "Communication—Efficient Distributed Dual Coordinate Ascent", Retrieved from URL: http://arxiv.org/abs/1409.1458v2, pp. 1-15.

(56) References Cited

OTHER PUBLICATIONS

Alexander Alexandrov, et al., "The Stratosphere platform for big data analytics", The VLDB Journal, Published online May 6, 2014, Springer, pp. 1-26.

Mikhail Bilenko, et al., "Towards Production-Grade, Platform-Independent Distributed ML", Proceedings of the 33rd International Conference on Machine Learning, 2016, pp. 1-5.

Matthias Seeger, et al., "Bayesian Intermittent Demand Forecasting for Large Inventories", 30th Conference on Neural Information Processing Systems (NIPS 2016), 2016, pp. 1-9.

Ronnie Chaiken, et al., "SCOPE: Easy and Efficient Parallel Processing of Massive Data Sets", PVLDB '08, Aug. 23-28, 2008, ACM, pp. 1265-1276.

Yossi Arjevani, et al., "Communciation Complexity of Distributed Convex Learning and Optimization", Retrieved from URL: http://arxiv.org/abs/1506.01900v2, pp. 1-27.

Tim Kraska, et al., "MLbase: A Distributed Machine-learning System", CIDR 2013, 6th Biennial Conference on Innovative Data Systems Research, pp. 1-7.

Abhay Jha, et al., "Clustering to Forecast Sparse Time-Series Data", 2015 IEEE 31st International Conference, 2015, pp. 1388-1399.

"ISF 2014 Economic Forecasting-Past, Present and Future", Foresight Fall 2013, Issue 31, The International Journal of Applied Forecasting, 2013, pp. 1-56.

Vinayak Borkar, et al., "Hyracks: A Flexible and Extensible Foundation for Data-Intensive Computing", Data Engineering (ICDE), 2011 IEEE 27th International Conference, pp. 1151-1162.

"KeystoneML", Retrieved from URL: http://keystoneml.org/index.html on Jan. 10, 2017, pp. 1-4.

Arun Kumar, et al., "Model Selection Management Systems: The Next Frontier of Advanced Analytics", ACM SIGMOD, Record 44.4, 2016, pp. 17-22.

Jimmy Lin, et al., "Large-Scale Machine Learning at Twitter", SIGMOD '12, May 20-24, 2012, pp. 793-804.

Amazon Web Services, "Amazon Machine Learning Developer Guide Version Latest", Updated Aug. 2nd, 2016, pp. 1-146.

Ce Zhang, et al., "Materlialization Optimizations for Feature Selection Workloads", SIGMOD '14, Jun. 22-27, 2014, pp. 1-12.

Cheng-Tao Chu, et al., "Map-Reduce for Machine Learning on Multicore", In Advances in Neural Information Processing Systems, 2007, pp. 281-288.

Matei Zaharia, et al., "Resilient Distributed Datasets A Fault-Tolerant Abstraction for In-Memory Cluster Computing", amplab UC Berkeley, 2012, pp. 1-30.

Matei Zaharia, et al., "Resilient Distributed Datasets A Fault-Tolerant Abstraction for In-Memory Cluster Computing", Proceedings of the 9th USENIX Conference on Networked Systems Design and Implementation, pp. 1-30.

Matthias Boehm, et al., "Hybrid Parallelization Strategies for Large-Scale Machine Learning in SystemML", Proceeding of the VLDB Endowment, vol. 7, No. 7, 40th International Conference on Very Large Data Bases, Sep. 1-5, 2014, pp. 553-564.

Yucheng Low, et al., "Distributed GraphLab: A Framework for Machine Learning and Data Mining in the Cloud", The 38th International Conference on Very Large Data Bases, Aug. 27-31, 2012, pp. 716-727.

Fabian Pedregosa, et al., "Scikit-learn" Machine Learning in Python, Journal of Machine Learning Research 12, 2011, pp. 2825-2830.

D. Sculley, et al. "Hidden Technical Debt in Machine Learning Systems", In Advances in Neural Information processing Systems, 2015, pp. 2503-2511.

Michael Armbrust, et al., "Spark SQL: Relational Data Processing in Spark", ACM, SIGMOD '15, May 31-Jun. 4, 2015, pp. 1-12.

Amol Ghoting, et al., "SystemML: Declarative Machine Learning on MapReduce", In Data Engineering (ICDE), 2011 IEEE 27th International Conference on, pp. 231-242.

U.S. Appl. No. 15/441,896, filed Feb. 24, 2017, Jan Alexander Gasthaus.

\* cited by examiner

| Date | Sales |
|---|---|
| ... | ... |
| 29-Feb-16 | 0 |
| 1-Mar-16 | 0 |
| 2-Mar-16 | 1 |
| 3-Mar-16 | 0 |
| 4-Mar-16 | 0 |
| 5-Mar-16 | 2 |
| 6-Mar-16 | 3 |
| 7-Mar-16 | 0 |
| 7-Mar-16 | 0 |
| 9-Mar-16 | 0 |
| 10-Mar-16 | 0 |
| 11-Mar-16 | 0 |
| 12-Mar-16 | 0 |
| 13-Mar-16 | 1 |
| 14-Mar-16 | 0 |
| 15-Mar-16 | 0 |
| 16-Mar-16 | 0 |
| 17-Mar-16 | 0 |
| 18-Mar-16 | 0 |
| 19-Mar-16 | 0 |
| 20-Mar-16 | 0 |
| 21-Mar-16 | 0 |
| 22-Mar-16 | 0 |
| 23-Mar-16 | 1 |
| 24-Mar-16 | 0 |
| 25-Mar-16 | 1 |
| 26-Mar-16 | 0 |
| 27-Mar-16 | 0 |
| 28-Mar-16 | 0 |
| 29-Mar-16 | 0 |
| 30-Mar-16 | 0 |
| 31-Mar-16 | 0 |
| 1-Apr-16 | 0 |
| 2-Apr-16 | 1 |
| 3-Apr-16 | 0 |

Price reduction period 220
Out-of-stock interval 222

Per-day sales time series 202
(for low-demand item I1)

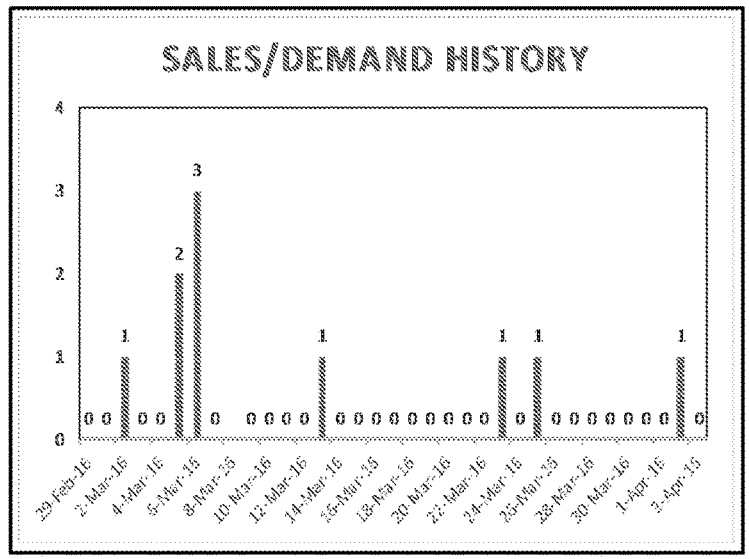

Sales graph 223 (item I1)

| Forecasting request examples 260 |
|---|
| Approximately how many I1s will be sold between May 1 – May 15? |
| Will any I1s be sold on April 15 if a 10% discount is applied? |
| What is the probability of selling three or more I1s on any single day in April or May? |

Forecaster 250

FIG. 2

```
trait GlobalLocalOptProblem[Instance] {
  def evalInstance(instance:Instance,
       localParams:DVec,
       globalParams:DVec,
       evalResultBox:EvalResultBox): Double
  def evalLocalRegularizer (localParams:DVec,
       evalResultBox: EvalResultBox): Double
  def evalGlobalRegularizer (globalParams: DVec,
       evalResultBox: EvalResultBox): Double
}
```

Problem specification interface example 705

```
trait GlobalLocalOptAlgorithm[Instance, P <: GlobalLocalOptProblem[Instance]] {
  type InstanceState
  type PartitionState
  type ExecutionContextType <: ExecutionContext[Instance, InstanceState, PartitionState]

def problem: P
  def minimize (context: ExecutionContextType): OptResult
}
```

Algorithm specification interface example 710

```
val myData = getTrainingData()
val optProblem = new
       LogisticRegressionProblem(getFeatureDim(myData))
val algorithm = new LBFGSOptAlgorithm(optProblem)
val context = new ClusterExecutionContext (algorithm)(myData)
val result = algorithm.minimize(context)
// extract optimal parameters and make predictions
```

Example invocation pseudo-code 720

```
trait ExecutionContext[Instance, InstanceState, PartitionState] {
  type MapUpdFun[A] = (Instance, InstanceState) => (A, InstanceState)
  type ReduceFun[A] = (A, A) => A
  type BcMapUpdFun[A,B] = (Instance, InstanceState, B) => (A, InstanceState)
  type MapPartUpdFun[A] = (Partition[Instance], Partition[InstanceState],
       PartitionState) => (A, Partition[InstanceState], PartitionState]

def broadcast[A] (value: A): Broadcast[A]
  def mapUpdReduce [A](mapUpdFun: MapUpdFun[A])(reduceFun: ReduceFun[A]):A
  def bcMapUpdReduce [A, B](mapUpdFun: BcMapUpdFun[A,B])(broadcastVal: B)
       (bcMapUpdFun: BcMapUpdFun[A,B])(reduceFun: ReduceFun[A]):A
  // [...]
  def mapPartitionsUpdReduce [A](mapPartUpdFun: MapPartUpdFun[A])
       (reduceFun: ReduceFun[A]):A
}
```

Execution context specification interface example 715

FIG. 7

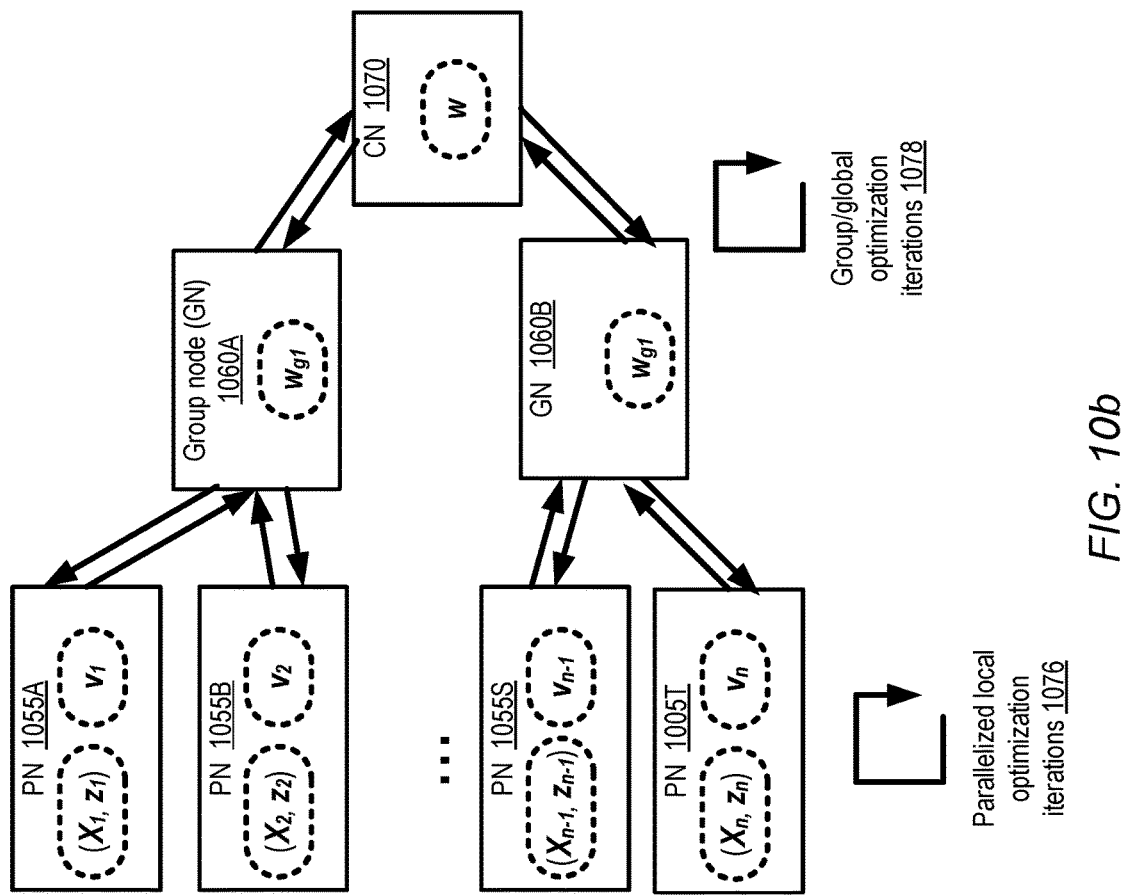
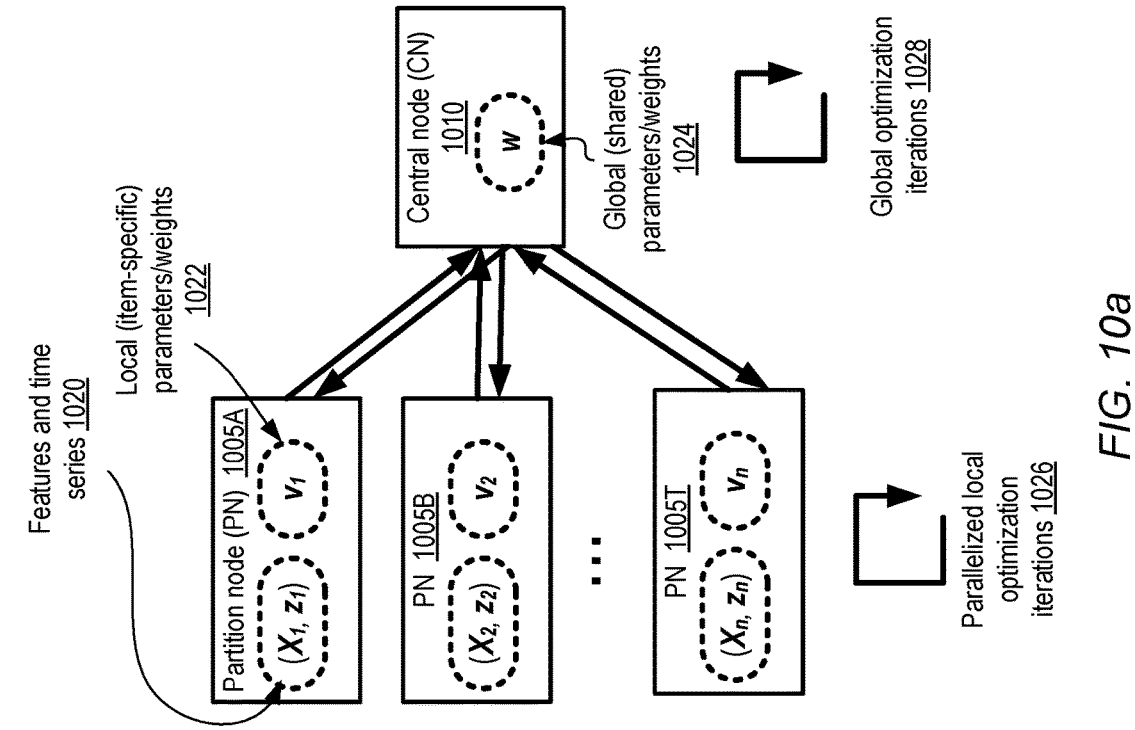
FIG. 10b
FIG. 10a

```
training {
   GLMGlobalLocal = [
      { satisfies = [demand_medium], include = true },
      { satisfies = [demand_high], include = true },
      { include = false }],
   Base = [{ include = true}]
   Zero = [ {include = false}]
}
```

Example training specification 1610

```
prediction {
     { satisfies = [likely_inactive], learners = { Zero = 1.0 }},
     ...
     { satisfies = [demand_hight, category_phone, winter]],
        learners ={GLMGlobalLocal = 0.5, Base = 0.5 }},
     ...
     { learners = { Base = 1.0 }},
}
```

Example prediction specification 1620

FIG. 16

TRAINING DATA ROUTING AND PREDICTION ENSEMBLING AT TIME SERIES PREDICTION SYSTEM

BACKGROUND

For many kinds of business and scientific applications, the ability to generate accurate forecasts of future values of various measures (e.g., retail sales or demands for various types of goods and products, utilization levels for various critical resources, error rates for critical components, etc.) based on previously collected data is a critical requirement. The previously collected data often consists of a sequence of observations called a "time series" or a "time series data set" obtained at respective points in time, with values of the same collection of one or more variables obtained for each point in time (such as the per-day sales for a particular inventory item over a number of months, which may be recorded at an Internet-based retailer). Time series data sets are used in a variety of application domains, including for example weather forecasting, finance, econometrics, medicine, control engineering, astronomy and the like.

The statistical properties of some time series data, such as the demand data for products or items that may not necessarily be sold very frequently, can make it harder to generate forecasts. For example, an Internet-based footwear retailer may sell hundreds of different shoes, and for most days in a given time interval, there may be zero (or very few) sales of a particular type of shoe. Relatively few winter shoes may be sold for much of the summer months of a given year in this example scenario. On the other hand, when sales of such infrequently-sold items do pick up, they may be bursty—e.g., a lot of winter shoes may be sold in advance of, or during, a winter storm. The demand for some items may also be correlated with price reductions, holiday periods and other factors. Some traditional prediction approaches, when confronted with time series which consist largely of zero demand values, may be unable to predict non-zero demands with desired accuracy levels, especially for the large lead times which may sometimes be required to replenish the supplies of the items.

Some organizations may be responsible for stocking and selling very large inventories, where the statistical properties of the demands for individual items within the inventory may vary, with some items selling much more slowly and with a greater degree of intermittency than others. In today's competitive environment, such organizations may be under substantial pressure to ensure that the supplies they maintain of various items are generally sufficient to meet customer needs. Sustained out-of-stock situations may, for example, lead to poor customer satisfaction and consequently to loss of customers. At the same time, the organizations also cannot afford to maintain excessive stocks of infrequently-purchased items—some of the organizations may for example sell millions of items, and the costs of overstocking all the items may quickly become unsustainable. In some cases, there may not be enough physical space in warehouses or fulfillment centers for storing items that do not sell as much as anticipated. Forecasting demand accurately for items with a variety of demand behavior characteristics in a timely and efficient manner may present a non-trivial challenge.

BRIEF DESCRIPTION OF DRAWINGS

FIG. 2 illustrates an example of a demand data set for an item, and examples of forecast-related queries for the item, according to at least some embodiments.

FIG. 7 illustrates examples of software interfaces for which respective implementations may be combined to solve global-local optimization problems, according to at least some embodiments.

FIG. 10a, FIG. 10b, FIG. 11a and FIG. 11b collectively illustrate examples of workload distribution for global-local optimization problems, according to at least some embodiments.

FIG. 16 illustrates simple examples of training and prediction specifications, according to at least some embodiments.

Figure 1:
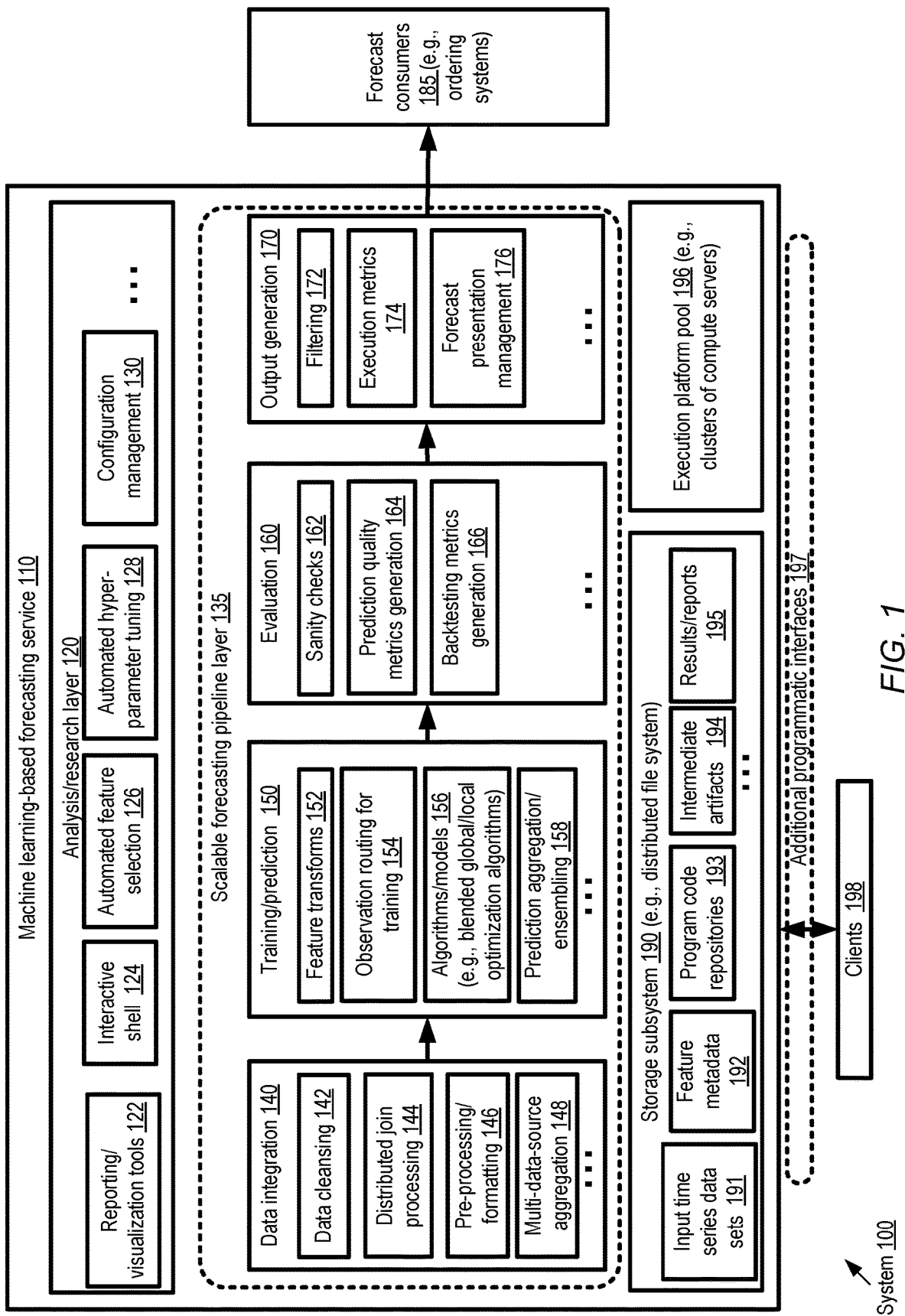
FIG. 1 illustrates an example system environment in which a machine learning based forecasting service for time series data, such as item demand observations, may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing distributed optimization algorithms for identifying combinations of local and global parameters to be used for predicting elements of time series, flexible routing of subsets of input data for the training phases of respective machine learning algorithms, and combining samples of prediction results of such algorithms are described. In at least some embodiments, such techniques may be executed at a network-accessible machine learning service, which may also be referred to as a forecasting service or a forecaster. The service may be designed to handle various aspects of complex machine learning pipelines used for analysis and predictions with respect to extremely large data sets in various embodiments, such as data sets comprising millions of time series corresponding to daily demand observations for respective items of a retailer's inventory or catalog over months or years. It is noted that although in much of the subsequent description, time series data sets and corresponding predictions may be discussed in the context of demand for items of an inventory, similar techniques to those described herein may be applied with equal success to other types of time series data such as resource utilization data, financial data and the like in various embodiments.

In at least some embodiments, the machine learning service may incorporate functionality that can handle a wide variety of demand characteristics in a scalable manner, such as varying lengths of product cycles for items, highly intermittent demand with frequent low (or zero) demand values for some items, strong seasonal variations in demand, strong promotional effects and the like. Furthermore, in various embodiments the machine learning service may be designed to cater to a variety of user requirements or usage modes. For example, requirements to execute forecasting algorithms stably and reliably in production scenarios, as well as requirements to provide the flexibility needed for rapid experimentation and algorithm development may both be satisfied in such embodiments. In at least some embodiments, much of the same underlying code base may be employed for relatively small-scale experiments and also for production-level training and prediction iterations.

At a high level, the demand forecasting problem may be expressed as follows with respect to at least some embodiments. Assume that, for various items of a collection (which may be referred to as a catalog or inventory), daily demand values, typically assumed to be indicated by non-negative integers representing sales orders, are collected. (Note that the use of actual sales values as indicators or demands represents an approximation, in that during time intervals in which a given item is out of stock, the sales would be zero even if there were non-zero demand.) Demand may be represented at a per-day granularity in some embodiments, although other granularities such as per-week granularity or per-hour granularity may also be used in various embodiments. The demand for an item i on day t may be represented as $z_{it} \in \mathbb{N}$.. The clients of the machine learning service being used for demand forecasting may wish to obtain probabilistic forecasts of demand for various set of items $i \in I$ with respect to a given lead time $t_L$ (assumed to be an absolute date in the future) and span $\delta_s$ (numbers of days) in the form of the following probability distribution:

$$Z_{I;(t_L,\delta_s)} = \Sigma_{i \in I} \Sigma_{t=t_L, \delta_s-1} Z_{i,t} \quad (1)$$

In equation (1), the second summation is over the range from $t_L$ to $(t_L+\delta_s-1)$. The machine learning system may be designed to provide consistent forecasts in at least some embodiments; that is, the predicted distribution of demand for some set of items over $(t_L, \delta_1+\delta_2)$ should ideally be the same as the sum of the predicted distributions for those items over $(t_L, \delta_1)$ and $(t_L+\delta_1, \delta_2)$. Moreover, at least in some embodiments, the design goals of the forecasting system may include allowing clients to query any quantile of the forecast distribution (e.g., the median or the $90^{th}$ percentile) for any combination of lead time and span in a reasonable range, and for any desired set of items I. Various techniques discussed below, such as the use of blended global-local optimization and the use of routing and ensembling methods, may enable these types of goals to be met in different embodiments.

A variety of heterogeneous operation modes may be supported at the machine learning service in some embodiments for respective types of workloads, including for example an ad-hoc mode as well as one or more automated usage modes. An ad-hoc usage mode may be employed, for example, for conducting single-machine experiments on small data sets to debug algorithms and/or fine tune models, or for running a single learning algorithm on a cluster of servers to test model changes on a larger dataset. The service may be used in an automated mode, e.g., using large clusters of servers as execution platforms, to generate demand predictions for large inventories using a predefined ensemble or combination of learning algorithms with a fixed set of features and hyper-parameters in various embodiments. Resource-intensive automated usage modes may also be employed, for example, for automatic model selection workloads, which may involve grid searches or Bayesian optimization techniques to explore large feature spaces and large hyper-parameter spaces in at least one embodiment. Exploratory workloads for identifying appropriate routing configurations, in which different subsets of input observations may be used to populate respective training data sets for numerous learning algorithms, as well as exploratory workloads for combining results from numerous learning algorithms to generate aggregated probabilistic demand forecasts for various items, may represent other potentially resource-intensive workloads run in automated usage mode in some embodiments. When new versions of software or hardware are released, large-scale back-testing workloads may be run at the machine learning service in one embodiment, e.g., to verify that the new versions produce reasonable results at reasonable levels of performance. As described below in further detail, the machine learning service may provide a number of programmatic interfaces and configuration techniques to ensure that the different types of workloads and usage modes can be supported with relatively little effort required from service users in various embodiments.

As mentioned above, in many cases the demand characteristics of different subsets of items of a catalog or inventory for which predictions are to be generated may vary widely. Furthermore, for some items of a changing catalog, not much demand history may be available (i.e., the time series of observed demand may be relatively short), so the algorithms may attempt to take similarities with other items into account in at least some embodiments. To help address the heterogeneity of the data as well as the different kinds of workloads expected in an efficient manner, in at least one embodiment a flexible software framework for distributed learning of forecasting models may be implemented by the machine learning service. Such a framework may be used to run algorithms which are designed to determine optimized values of item-specific parameters as well as shared parameters (parameters that are common to several items of the catalog, or to all the items of the catalog) in various embodiments. Item-specific parameters, whose optimal values may differ from one item of the inventory to another, may also be referred to as "local" parameters in some embodiments. Shared parameters, for which common optimal values may be determined with respect to all items of the catalog, may also be referred to as "global" parameters in various embodiments. In at least some embodiments, parameters may be organized into a multiple-level hierarchy instead of being characterized as either item-specific or global; for example, respective sets of parameters may be shared among respective subsets of the catalog of items as discussed below in further detail. The problem of determining optimal values for parameter sets that may contain item-specific and/or shared (global or hierarchical) parameters may be referred to in various embodiments as "global-local" optimization or blended global-local optimization. Respective nodes of a cluster of servers may be used in parallel to perform optimization operations with respect to item-specific or item-group-specific parameters in some embodiments, thereby speeding up the training of the forecasting models substantially.

According to at least one embodiment, the framework may separate the treatment of three aspects of the distributed global-local optimization work. Clients of the machine learning service may, for example, be able to specify, using respective programmatic interfaces, (a) optimization problems to be addressed, (b) the global-local algorithm to be used for a given problem, and/or (c) the execution context in which the algorithms are to be executed in some embodiments. An execution context may, for example, encapsulate how a given optimization algorithm is to be applied to the corresponding data, how distributed state information is maintained for the algorithm, and/or how communication between respective nodes of the potentially distributed compute environment is to occur. Further details regarding specifications or descriptors of optimization problems, global-local optimization algorithms, execution contexts, and the manner in which these three types of entities may be employed together in various embodiments are provided below. Multiple algorithms may be executed for a given data set and corresponding optimization problem specification upon request in some embodiments. Similarly, a given global-local algorithm may be executed at several different execution platforms with corresponding execution contexts, if desired, to solve a particular optimization problem in at least one embodiment. In at least some embodiments, repositories in which extensible libraries of global-local algorithms, execution contexts, and/or optimization problem specifications are stored may be maintained at the machine learning service, and clients of the service may be able to mix and match algorithms and execution contexts for various problems and data sets as desired. In some embodiments, the machine learning service may be able to automatically select or recommend appropriate global-local optimization algorithms for a given optimization problem specification. In one embodiment, the machine learning service may be able to automatically select or recommend execution contexts and/or associated execution platforms for a given combination of a data set, an optimization problem and an algorithm.

In some embodiments, one or more computing devices of a machine learning service may receive or obtain a specification of a first optimization problem pertaining to a data set comprising respective time series observations of a plurality of items. A first parameter set associated with a first item may comprise one or more item-specific parameters and one or more shared parameters, with individual ones of the shared parameters being associated with multiple items. The optimization problem specification may include, among other elements in various embodiments, respective evaluators or evaluation functions for (a) a loss function or objective function to be optimized, where the loss function is expressed at least in part in terms of the item-specific and/or shared parameters, and (b) zero or more regularizers for the optimization. In one embodiment, for example, respective indications of a local or item-specific regularizer, as well as a shared regularizer applicable to multiple items, may be provided in the problem specification together with the corresponding evaluators. In some embodiments, a formula to be used for the loss function, or a name of a loss function, may be provided or indicated in the problem specification, and the machine learning service may identify a technique or method to be used to evaluate the loss function for individual items. Similarly, with respect to regularizers, the level of detail provided may vary in different embodiments—e.g., in one embodiment the type of regularization to be used may be indicated instead of providing an evaluator.

The machine learning service may identify a global-local optimization algorithm to be used to select values of at least some parameters of the first parameter set using the loss function and the regularizers (if regularizers are indicated in the problem specification) in some embodiments. In one embodiment, a client may specify the algorithm(s) to be used, e.g., using a programmatic interface. In other embodiments, the service may select the global-local algorithm(s) automatically (e.g., from a library of algorithms stored at a repository) without additional client guidance, or propose a recommended algorithm to the client. A number of factors may be taken into account when the service selects the algorithm—e.g., the details regarding parameters provided in the optimization problem specification, the size of the input data set representing the plurality of items, resource constraints such as the number of execution platforms available, and/or a determination that one or more time series of the input data set meets an intermittency criterion may be considered in some embodiments. In at least one embodiment, a nested global-local algorithm may be identified, in which optimization operations for one or more item-specific parameters are nested within a optimization operation for one or more shared parameters. In another embodiment, an iterative global-local algorithm may be identified, in which iterations of optimization operations for item-specific parameters are interleaved with iterations of optimization operations for one or more shared parameters. The optimization iterations associated with different groups of item-specific parameters may, at least in principle, be performed in parallel on respective execution platforms (e.g., respective nodes of a cluster) in one embodiment. Further details regarding alternative optimization algorithms which may be used in different algorithms are provided below. In various embodiments, the optimization operations may involve identifying parameter values which result in obtaining either type of extrema of objective functions—e.g., in some cases an objective function may be minimized, while in other cases an objective function may be maximized.

In at least some embodiments, having identified an optimization algorithm to be used for a specified optimization problem, the machine learning service may determine an execution context and an execution platform (or set of platforms) to be employed to run the optimization algorithm. The execution context may indicate an implementation of one or more functions which can be used in a distributed and/or single-platform environment, such as a fused map-update-reduce function in which state information pertaining to a given item or group of items is mutated and stored, e.g., at various individual nodes of a cluster. The execution context may encapsulate or hide the internal representation of the state information in at least some embodiments, so that implementation details of how or where state information is stored are not accessible. In some embodiments, a client may specify an execution context for the optimization problem and the algorithm selected; in other embodiments the machine learning service may select or recommend the execution context. In at least one embodiment, a given execution context may be explicitly tied to a given set of execution platforms (such as a cluster of servers)—that is, if a given execution context is selected for an algorithm, this would imply that a corresponding set of execution platforms would be employed for the algorithm. In other embodiments, at least some aspects of the execution platform, such as the number of nodes in a cluster and/or the mappings between items and cluster nodes may be configurable with respect to a given execution context—e.g., either the client or the machine learning service may be able to select the particular execution platforms to be used. After the execution platforms and context have been identified, the algorithm may be run using the execution platforms and the functions supported by the execution context in various embodiments, and an optimized set of parameters (e.g., including item-specific and/or shared parameters) for the items indicated in the optimization problem specification may be determined. The optimized parameters may be used to generate probabilistic forecasts or predictions for future values of the time series corresponding to one or more items in various embodiments.

In some embodiments, respective subsets of an input data set may be used to train different learning algorithms to be used for predicting time series values at the machine learning service. For example, some models may be tailored towards specific groups of items that share characteristics such as seasonality, or towards groups of items within a particular price range. In at least one embodiment, the machine learning service may allow clients to provide training specifications which include routing directives for selecting respective subsets of the input observations and associated feature metadata for training different learning algorithms. In some embodiments, the machine learning service may allow clients to provide prediction aggregation specifications indicating how samples of results obtained from multiple trained learning algorithms should be combined to generate output probabilistic forecasts for various items. Additional details and examples of the contents of training specifications and aggregation specifications are provided below. In at least some embodiments, the machine learning service may also provide a high-level dataflow abstraction framework which can be used to model various operation modes of the kinds discussed above.

Example System Environment

FIG. 1 illustrates an example system environment in which a machine learning based forecasting service for time series data, such as item demand observations, may be implemented, according to at least some embodiments. As shown, system 100 may comprise various subsystems and layers of machine learning-based forecasting service 110, including an analysis and research layer 120, a scalable forecasting pipeline implementation layer 135, a storage subsystem 190, and a pool of execution platforms 196 in the depicted embodiment.

The analysis and research layer 120 may be primarily directed towards real-time interaction and experimentation in the depicted embodiment. Layer 120 may comprise, for example, a set of reporting and visualization tools 122, an interactive shell environment 124, automated feature selection tools 126, an automated hyper-parameter selection tool 128, and/or one or more configuration management tools 130. The reporting and visualization tools 122 may be used to plot and compare results of various experiments, or view various statistical characteristics of input data sets, intermediate results and the like. The interactive shell environment 124 may provide a command-line interface in the depicted embodiment, and may for example represent an enriched version of public-domain shell environments such as Spark-shell with useful abstractions for common tasks such as data loading. For at least some forecasting problems, subsets of features which are expected to be more useful than other features for prediction may be automatically selected using feature selection tools 126. Recommended hyper-parameter values for various learning and/or optimization algorithms may be obtained using hyper-parameter selection tool 128. Configuration management tools 130 may be used, for example, to assemble and name clusters of execution platforms from pool 196, manage reservations and sharing of execution platforms, generate routing and prediction aggregation specifications of the kind described below, and so on. In addition to the programmatic interfaces (such as visualization tools, an interactive shell and so on) discussed in the context of the analysis and research layer, the machine learning service 110 may also implement additional programmatic interfaces 197 such as application programming interfaces (APIs), web-based consoles, command-line tools, and/or graphical user interfaces which can be used by clients 198 of the service to submit requests for forecasting, to receive intermediate or final results of forecasting algorithms, to view resource consumption information associated with various forecasting operations, and so on in the depicted embodiment.

The data integration components 140 of the scalable pipeline layer 135 may comprise, for example, multi-data-source tools 148 to combine data from a variety of data sources, raw data pre-processing tools 146, data-cleansing tools 142 as well as tools for performing distributed joins among observation data records as needed in the depicted embodiment. Such joins may be used, for example, to construct distributed de-normalized tables in which each row comprises all the available data for a given item of an inventory or catalog. The training and prediction components 150 may include tools for feature transformations 152, observation routing for training of learning algorithms 154, the algorithms and models 156 used for learning parameters for forecasting time series values (included distributed global-local optimization algorithms of the kind mentioned earlier), as well as tools for prediction aggregation or ensembling 158 in the depicted embodiment. An extensible software framework which can be used for independently specifying and combining optimization problems, the algorithms to be used to solve those problems, as well as the execution contexts in which the algorithm are to be run, may be implemented as part of the training and prediction components 150 in some embodiments.

The observation routing tools 154 may assign respective groups of items to train respective learning algorithms, e.g., based on declarative routing specifications provided by clients 198 or generated internally in the depicted embodiment. Individual learning algorithms may have respective feature transformation flows 152 associated with them, as well as associated pre and post-processing logic. The feature transformations 152 may, for example, convert raw data into sparse matrices and provide customizable as well as standard transformations such as crossing, binning, normalization etc. during the conversion to matrices in at least some embodiments. In some embodiments, an invocation of a given learning algorithm may include a training phase followed by a prediction phase, where the training phase may use spare linear algebra tools and convex optimization libraries, while the prediction phase applies sampling methods. The output of each run of a learner may comprise probability distributions of forecast values for various elements of time series, which may also be referred to as sample paths in various embodiments. The outputs from multiple learners may be combined to generate a final aggregated probabilistic forecast according to a prediction aggregation specification as discussed below in further detail.

The evaluation components 160 may be used to perform sanity checks 162, to generate metrics 164 indicative of prediction quality as well as back-testing related metrics 166 in the depicted embodiment. Evaluation-related program code may be consolidated in a single repository in some embodiments, e.g., to guarantee consistency and safeguard against errors. For many machine learning applications, errors in evaluations may be more resource-costly than errors in models or algorithms, and consistency may be especially important when handling edge cases or non-standard definitions of metrics such as quantiles of count distributions. The evaluation components may operate on sample paths generated by the trained forecasting algorithms, which may simplify the task of aggregating across items and time periods and generating quantile metrics. In at least some embodiments, computing evaluations may be resource intensive; as a result, multiple metrics may be generated during a single scan of the data, and the evaluation data may be stored in persistent storage (e.g., using storage subsystem 190). Output generation components 170 may be used to combine the forecasting results with execution metrics 174, filter the appropriate subsets of results using filtering tools 172, and use presentation management tools 176 to generate data in the appropriate formats for different forecast consumers 185 such as ordering systems and the like in the depicted embodiment.

A variety of storage devices may be used at storage subsystem 190 in different embodiments. For example, in some embodiments, a distributed file system may be used, or one or more storage services of a provider network may be employed. Input time series data sets 191, feature metadata 192, program code repositories 193 (e.g., comprising concrete instances or implementations of the optimization problem specifications, algorithm specifications, and/or execution context specifications similar to those discussed below), intermediate artifacts 194 produced during various stages of the forecasting pipeline such as distributed state information used in global-local algorithms, as well as various versions of forecasting results and/or reports 195 may be stored at the storage subsystem in the depicted embodiment. Source code versions and/or executable code versions of the program code may be stored in repositories 193 in various embodiments in Execution platform pool 196 may include a variety of virtual and/or physical platforms in different embodiments, including clusters of compute servers from various vendors.

In at least some embodiments, specifications of optimization problems may be submitted to the machine learning service 110 via programmatic interfaces 197 by service clients 198. Parameter sets associated with various items of a data set may comprise item-specific parameters as well as shared/global parameters. An optimization problem specification may indicate a loss function or objective function expressed in terms of the item-specific and/or shared parameters, and in some cases one or more regularizers for the optimization. Program code to evaluate the loss function and/or regularizers may be included in the problem specification in various embodiments. In one embodiment, the problem specification may indicate various aspects of a neural network model (e.g., the number of nodes at various layers of the model, the details of the artificial neurons and their interconnections, and so on) to be used to evaluate the loss function. The machine learning service 110 may identify a global-local optimization algorithm to be used to select values of at least some parameters using the loss function and the regularizers (if regularizers are indicated in the problem specification) in some embodiments. In one embodiment, a client 198 may specify the particular global-local algorithm(s) to be used. In other embodiments, the service may select the global-local algorithm(s) automatically without additional client guidance, or propose a recommended algorithm to the client. In at least one embodiment, a nested global-local algorithm may be identified for a given optimization problem, in which loss minimization operations for one or more item-specific parameters are nested within a loss minimization operation for one or more shared parameters. In another embodiment, an iterative global-local algorithm may be identified, in which iterations of optimization operations for item-specific parameters are interleaved with iterations of optimization operations for one or more shared parameters. Further details regarding alternative optimization algorithms which may be used in different algorithms are provided below.

In at least some embodiments, the machine learning service may determine an execution context and an execution platform (or set of platforms) from pool 196 to be employed to run an optimization algorithm on a given data set. As mentioned earlier, an execution context may include program code for an implementation of one or more functions which can be used in a distributed and/or single-platform environment, such as a fused map-update-reduce function in which state information pertaining to a given item or group of items is mutated and stored, e.g., at various nodes of a cluster. The execution context may encapsulate the internal representation of the state information in at least some embodiments, so that implementation details of the manner in which state information is stored are not accessible. In some embodiments, a client 198 may specify an execution context for the optimization problem and the algorithm selected; in other embodiments the machine learning service may select or recommend the execution context. The algorithm may be run using the execution platforms and the functions supported by the execution context in various embodiments, and an optimized set of parameters (e.g., including item-specific and/or shared parameters) for the items indicated in the optimization problem specification may be determined. The optimized parameters may be used to generate probabilistic forecasts or predictions for future values of the time series corresponding to one or more items in various embodiments.

The probabilistic forecasts may be used to make various types of business decisions more intelligently in different embodiments—e.g., to generate purchase orders for appropriate quantities of items at appropriate times, to decide whether it is worthwhile to continue stocking various items or not, to plan ahead for warehouse space expansions, and so on. In at least some embodiments, the forecasts may be provided as input to an automated ordering system, which may in turn transmit orders for various inventory items to meet business requirements of the organization on behalf of which the forecasts were produced. In some embodiments, the output of the algorithm may be provided to other automated forecast-consuming entities or systems, such as a discount planning system, a facilities planning system, a promotions planning system or a product placement planning system. Using the demand predictions of the algorithm, the discount management system may, for example, make recommendations or decisions regarding if, when, for how long and by how much the price of a particular inventory item should be reduced. A facilities planning system may use the forecasts for managing warehouse space for various products. A promotions planning system may be able to recommend specific tie-ins with external factors (such as a sale of a particular set of items associated with a release of a motion picture or the staging of a sports event) using the forecasts. A product placement planning system may utilize the forecasts for helping recommend the shelf locations of various items in a physical store, or whether an item should be placed in a shopfront window, for example. In some embodiments, the forecasts may be used to anticipate side effects of future demands, such as increases or decreases in shipping costs, which may influence business contracts with mailing/delivery services and so on.

Intermittent Demand Time Series Example

As mentioned earlier, in at least some embodiments the time series observations provided to a forecaster with respect to various items may exhibit sparsity or intermittency characteristics. FIG. 2 illustrates an example of a demand data set for an item, and examples of forecast-related queries for the item, according to at least some embodiments. Time series 202 shows example per-day sales for an item I1 over a 35-day time period which may be obtained by a forecaster 250. The per-day sales are also plotted in graph 223. The majority of the sales (28 out of the 35 observations) are zero—that is, no purchases of item I1 are recorded on most days. On five days, a single instance of item I1 is sold, and more than one instance was sold only on two days. Such intermittent demand behavior may cause computational difficulties for some types of traditional forecasting techniques.

In addition to the raw sales/demand data, some metadata (which may potentially have some explanatory role regarding the sales of I1 on at least some days) may also be made available to forecaster 250 in the depicted embodiment. For example, with respect to the time period 220 between March 4 and March 6, the metadata may indicate that a temporary price reduction for I1 was in effect, and this may have had some bearing on the increased sales on March 5 and March 6. In addition, forecaster 250 may also be informed programmatically that item I1 was out of stock 222 on March 14 and March 15, which means that there could not have been non-zero sales on at least those days even if there was non-zero customer demand.

Table 260 shows a few examples of the kinds of queries regarding future I1 demand that may be posed programmatically to the forecaster 250. Some customers may want to know how many total sales should be expected to occur in a given data range. Others may want to know how much a particular discount might affect sales, or the probability of selling a particular number of instances of I1 on a single day. In at least some embodiments, programmatic interfaces that allow customers to submit forecast queries similar to those shown in FIG. 2 may be implemented. In one embodiment, natural language query interfaces may be supported; in another embodiment, a query interface based on a variant of the structured query language (SQL) may be supported. Using blended global-local optimization algorithms of the kind discussed above, parameter values usable to generate predictions which can help answer queries similar to those shown in table 260 may be generated efficiently in at least some embodiments.

In at least some embodiments, a forecaster may use models (e.g., generalized linear models or GLMs) with multi-stage likelihood to deal with non-standard demand distributions similar to that shown in FIG. 2. In one such embodiment, at a stage 0 of the analysis, a logistic regression model decides $z_{it}=0$ versus $z_{it}>0$ (where $z_{it}$ is the demand for an item i at a time series index t as discussed above in the context of equation (1)), either emitting $z_{it}=0$ or handing over to a stage 1, where a second classifier decides $z_{it}=1$ versus $z_{it}>1$. Finally, if $z_{it}>1$, Poison regression may be used on the transformed target $z_{it}-2$ in such embodiments employing multi-stage likelihoods.

Probabilistic Demand Forecasts

Figure 3:
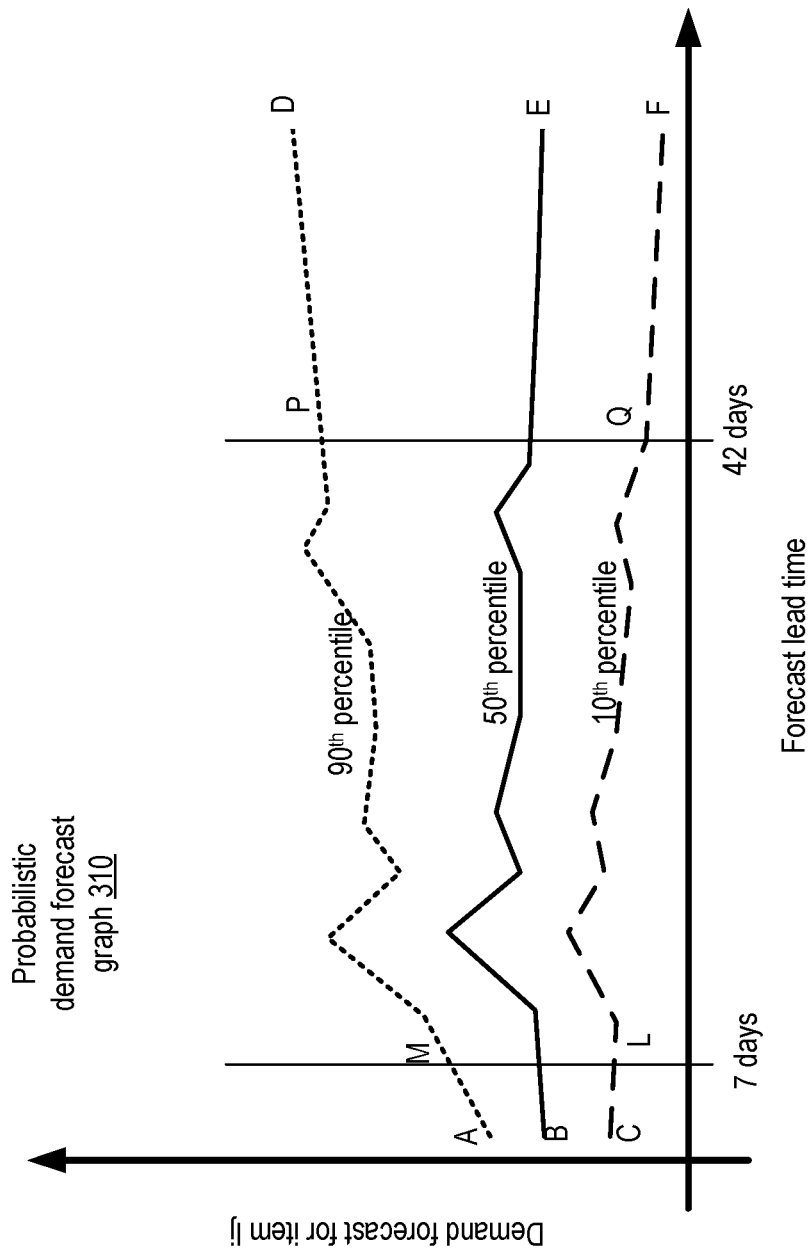
FIG. 3 illustrates an example of a probabilistic demand forecast graph which may be produced by a forecaster, according to at least some embodiments.

In various embodiments, distributional forecasts may be represented by sample paths. For each item i in a catalog's data set, demand values $z_{it}$ may be sampled over a prediction range, and this process may be repeated several times. Distribution-oriented queries, such as the 90% quantile for demand at a lead time of x weeks and a span of y weeks may be answered in at least some embodiments by averaging over the samples. Such sample-based approaches may be flexible and easy-to-use, and may lead to the desired consistency discussed in the context of equation (1). Furthermore, sample paths may also allow for easy combination of aggregation of predictions from different algorithms as discussed below in further detail with respect to various embodiments. FIG. 3 illustrates an example of a probabilistic demand forecast graph which may be produced by a forecaster, according to at least some embodiments. In the depicted embodiment, forecast lead time (i.e., the difference between the time for which the forecast is to apply, and the time when the forecast is predicted) increases from left to right on the X-axis of graph 310, and the lead time is expressed in days. The predicted demand for a particular item $I_j$ of an inventory is represented along the Y-axis.

The demand curves AMPD, BE, and CLQF correspond respectively to a $90^{th}$ percentile confidence level, a $50^{th}$ percentile confidence level, and a $10^{th}$ percentile confidence level with regard to the demand for the item. Multiple (e.g., hundreds) of executions of one or more learning algorithms may be performed relatively quickly in some implementations, each resulting in a different demand curve. The respective curves corresponding to the individual executions may be analyzed and aggregated to obtain the probabilistic result shown in FIG. 3. In at least some embodiments, a programmatic interface (e.g., a web-based console or a graphical user interface) may be used to display probabilistic demand graphs such as graph 310. In at least one embodiment, category-level probabilistic forecasts, or probabilistic forecasts for groups of items rather than individual items, may be provided by the forecaster.

As indicated by the relative widening of the gap between the $10^{th}$-percentile and $90^{th}$-percentile curves as the lead time increases, the uncertainty of the forecast produced may increase as time periods further in the future are considered. For example, 7 days in the future, the gap between the $90^{th}$ percentile and the $10^{th}$ percentile corresponds to the length of segment ML, while 42 days in the future, the gap corresponds to the longer segment PQ. In some embodiments, forecast customers may be able to programmatically indicate the particular confidence levels for which they wish to view forecasts.

Heterogeneous Item Inventories

Figure 4:
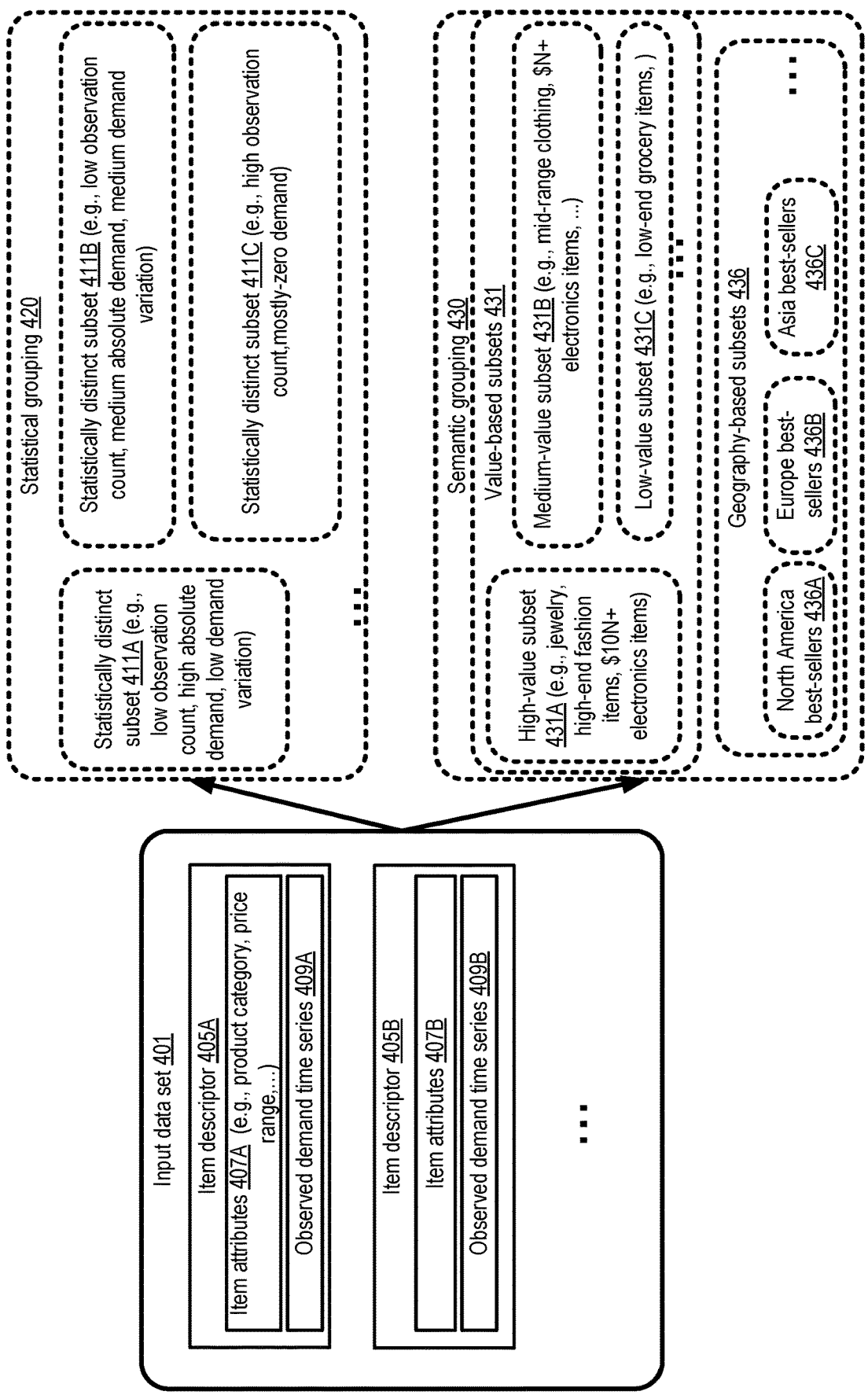
FIG. 4 illustrates examples of heterogeneous subsets of an item inventory for which demand forecasts may have to be generated, according to at least some embodiments.

As mentioned earlier, the items included in an inventory for which time series forecasts may be produced in some embodiments may differ significantly from one another along several dimensions. FIG. 4 illustrates examples of heterogeneous subsets of an item inventory for which demand forecasts may have to be generated, according to at least some embodiments. It is noted that in at least some embodiments, although the net effect of the operations performed at the machine learning service may be that different subsets of the inventory end up being treated differently, individual items or the corresponding time series may not necessarily be explicitly categorized as belonging to distinct subsets in advance, and the boundaries between subsets may not necessarily be explicitly defined.

In the depicted embodiment, an input data set 401 representing an inventory may comprise a plurality of item descriptors 405, such as 405A or 405B. An individual item descriptor 405 may in turn comprise some set of item attributes 407 (e.g., attributes 407A or 407B), as well as an observed demand time series 409 (e.g., time series 409A or 409B). It is noted that the set of attributes (which may include information about the product category to which the corresponding item belongs, a price range of the item etc.) whose values are available for a given item may differ from the set of attributes whose values are available for a different item in some embodiments. Similarly, the number of entries or elements in the demand time series 409 may differ from one item to another in at least one embodiment.

The item descriptors 405 may be categorized according to various statistical measures of the demand time series in some embodiments, as indicated by statistical grouping 420. Subsets 411A and 411B may each have a relatively low observation count (i.e., number of distinct items which belong to the subset) compared to subset 411C in the example scenario shown in FIG. 4. The absolute demand values (e.g., the average number of items sold) may be highest for subset 411A and lowest for subset 411C, with items having medium absolute demand values being represented by subset 411B. The subsets may also differ from one another in the variation in demand within individual time series—e.g., subset 411A may have relatively low demand variation from observation to observation, subset 411B may have higher demand variation, while in subset 411C demand may exhibit intermittency with most demands being zero (similar to the characteristics of the demand time series shown in FIG. 2).

The item descriptors 405 may also be classified based on one or more semantic dimensions in some embodiments, as indicated in semantic grouping 430. For example, the items may be grouped into subsets 431 on the basis of their business value (which may in some cases be correlated with revenue, price or profit margin). In the depicted example, items may be placed into a high-value subset 431A, a medium-value subset 431B and a low-value subset 431C. For example, within the catalog of a retailer, jewelry items, high-end fashion items, or electronics items with a price over a particular threshold represented as $10N in FIG. 4 may be included in high-value subset 431A, while mid-range clothing and less expensive electronic items may be placed in medium-value subset 431B, while low-end grocery items may be placed in a low-value subset 431C. If the catalog is that of a geographically distributed enterprise, e.g., one with customers in various regions or countries, geography-based subsets 436 of items may be defined in some embodiments, such as the best-selling items 436A in North America, best-sellers 436B in Europe, best-sellers 436C in Asia, and so on. In at least some embodiments, different sets of model parameters may be used at a machine learning service to represent heterogeneous item characteristics such as those indicated in FIG. 4—for example, some number of group-level parameters may be optimized for generating forecasts, and some number of item-specific parameters may be optimized.

Framework for Blended Global-Local Optimization

Figure 5:
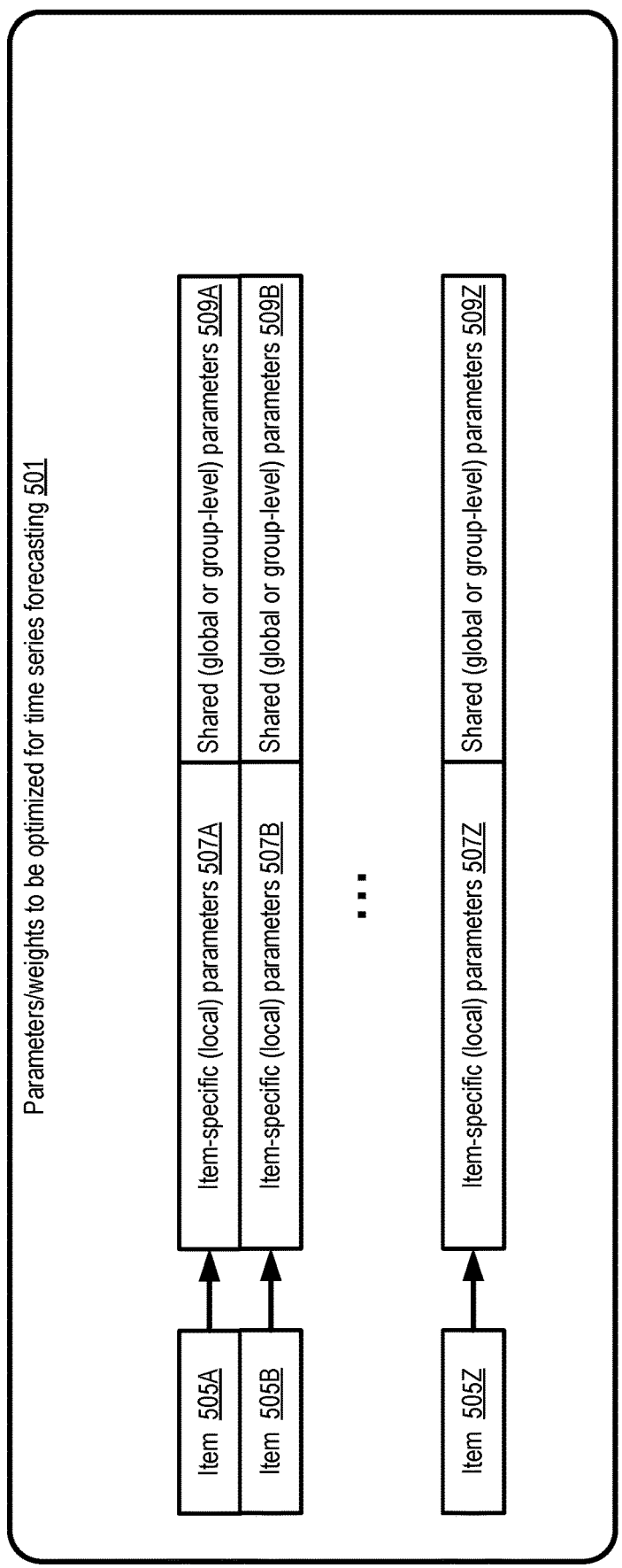
FIG. 5 illustrates examples of respective parameter sets for items of an inventory, comprising item-specific and shared parameters whose values may be optimized to generate predictions for future demands of the items, according to at least some embodiments.

FIG. 5 illustrates examples of respective parameter sets for items of an inventory, comprising item-specific and shared parameters whose values may be optimized to generate predictions for future demands of the items, according to at least some embodiments. In the depicted embodiment, the parameters or weights 501 of the catalog as a whole may be logically divided into at least two types. With respect to individual items such as item 505A, 505B or 505Z, a corresponding parameter set may include one or more item-specific or local parameters 507 (e.g., 507A, 507B or 507Z), as well as one or more shared parameters 509 (e.g., 509A, 509B or 509Z). In some embodiments, the shared parameters may be common to respective groups of items, while in other embodiments at least some parameters may be considered global in that they may be common to all the items of the inventory being considered. In at least some embodiments, a multi-level group hierarchy may be used for a given inventory, in which some parameters are global, others are local or item-specific, and others are associated with respective groups of items at various levels of the hierarchy.

Optimization approaches to deal with combinations of local and shared parameters, which may be termed global-local optimization approaches, may be formalized as follows in some embodiments. To simplify the presentation, a two-level hierarchy of parameters is assumed in much of the following discussion, with parameters being either item-specific (local) or shared with all other items (global), although the approach may be extended in various embodiments to multi-level hierarchies of parameters. The global-local optimization problem to be solved may be represented in some embodiments as:

$$\arg\min_{(w,\{v_i\})} L(w,\{v_i\}) := \Omega(w) + \Sigma_{i=1,N}[L_i(w,v_i) + \omega_i(v_i)] \quad (2)$$

In equation (2), an inventory with N items is being considered (hence the summation from 1 to N). $\Omega(w)$ is a global regularizer, $L_i(w,v_i)$ are local loss functions and $\omega_i(v_i)$ are local regularizers. The local loss functions $L_i$ depend on a set of global parameters $w \in \mathbb{R}^D$ and also on local parameters $v_i \in \mathbb{R}^{D_i}$, while the local regularizers depend only on $v_i$ and the global regularizer depends only on w. In some embodiments, a distributed setting may be assumed, in which individual items i=1, ..., N are associated with a logical partition (e.g., a compute/storage node) k(i)=1, ..., K which can be used to perform computations involving $L_i$ and $\omega_i$. If we denote by I(k) the set of items assigned to a partition k, a distributed version of equation (2) may be rewritten as follows:

$$\arg\min_{(w,\{v_i\})} \Omega(w) + \Sigma_{k=1,K} L_k(w, \{v_i\}_{i \in I(k)}) \quad (3)$$

where $L_k(w,\{v_i\}_{i \in I(k)}) := \Sigma_{i \in I(k)}[L_i(w,v_i) + \omega_i(v_i)]$.

In one simple concrete example of the use of the formalization indicated in equations (2) and (3) according to one embodiment, assume that the problem to be solved is to predict whether a particular item i will be sold on some day t in the future. Assume that training data available is of the form $\{(x_{it}, y_{it})\}$ for t=1, ..., T, and 1=1, ..., N with features $x_{it}$ describing attributes of item i and the time (e.g., day) t, and label $y_{it}$ denoting whether the item was sold or not at time t. The following logistic regression model may be set up:

$$P(y_{it}=1|x_{it}) = \sigma(w^T x_{it} + v_i^T x_{it}) \quad (4)$$

with a global parameter vector w intended to capture effects that are shared between items and a local parameter vector $v_i$ intended to capture effects unique to an individual item i. Both parameter vectors may be assumed to apply to the same set of features in this example. In order to learn the parameters using maximum likelihood, an optimization problem representable by equation (2) may be solved, with $L_i(w, v_i) = -\Sigma_t \log P(y_{it}|x_{it})$. If we assume L2 regularization (with regularization parameters indicated by $\lambda$), $\Omega(w) = (\lambda/2)\|w\|^2$ and $\omega_i(v_i) = (\lambda_i/2)\|v_i\|^2$. The data for item i may be stored at a particular machine associated with a partition k(i) in a cluster of machines in some embodiments, and this partitioning may be used to speed up the optimization using the techniques discussed below. The goal of the optimization may be to find optimal values of w and $v_i$ that maximize the log-likelihood in this example, and to use those optimal values to make predictions for the future values of $y_{it}$.

One challenge associated with problems of this form in various embodiments is how best to make use of the fact that the data may be stored on multiple machines, each of which can carry out operations efficiently on the data that it stores locally. An effective tradeoff between the amount of (fast) local computation and the amount of (potentially slow) communication between machines may have to be made, while at the same time avoiding slowdown of global convergence (e.g., by requiring smaller step sizes). Another challenge may arise from the fact that local state associated with individual vis may have to be stored and updated, which may sometimes be difficult in the distributed setting, or may not be natively supported by some computing frameworks.

A flexible software framework such as that described below which can be used to overcome these types of challenges may be implemented in at least some embodiments. Using such a framework, the global-local structure of optimization problems representable by equation (2) may be taken into account using at least two approaches: alternating minimization and nested minimization.

In an alternative minimization algorithm, respective iterations of optimizing some subset of the parameters may be interleaved with iterations of optimizing other parameters. In one embodiment, in one type of iteration, the loss function indicated in (2) may be (partially) minimized with respect to values for w while keeping $v_i$ fixed. In the second type of iteration, for all i, the loss function indicated in (2) may be minimized with respect to $v_i$ while keeping w fixed. This second type of iteration involving finding optimal; values of local or item-specific parameters may be performed independently and in parallel for individual items in at least some embodiments. In one embodiment, for example, the machine learning service may alternate between optimizing (2) with respect to w while keeping $v_i$ fixed using the L-BFGS (Limited-memory Broyden-Fletcher-Goldfarb-Shanno) algorithm with distributed gradient computation until some selected convergence criterion is reached, and optimizing each term $L_i$ with respect to $v_i$ while keeping w fixed, until some other selected convergence criterion is reached. Neither the local nor the global problem may need to be optimized completely in each iteration in such an embodiment. The convergence speed of the alternating minimization algorithm may depend on how local and global optimizations are traded off in some embodiments. For example, the inner (local) optimization could be performed to some desired tolerance depending on the outer iteration number in one embodiment, and a single gradient step may be taken in the outer (global) loop. The internal state kept by the global or local optimizers (e.g., the approximation to the inverse Hessian matrix maintained in L-BFGS) may have to be reset when switching between global and local iterations in at least some embodiments. An alternative nested optimization algorithm described below may sidestep this requirement in some embodiments.

In a nested minimization algorithm employed in at least one embodiment, the minimization over $v_i$ may be pushed inside the summation within equation (2):

$$\arg\min_w \Omega(w) + \Sigma_{i=1,N} \tilde{L}_i(w), \tilde{L}_i(w) := \min_{v_i}[L_i(w,v_i) + \omega_i(v_i)] \quad (4)$$

In this approach, the optimization of values for local parameters may be nested within the optimization operations for global parameters. Any of a number of specific distributed convex optimization algorithms may be applied in the nested manner in different embodiments, including for example variants of L-BFGS, various consensus-based algorithms such as ADMM (alternating direction method of multipliers) and the like. In order to make the nested approach effective in practice, the inner optimization may need to be solved as quickly as possible, as they have to be solved for every evaluation of the global objective function. One technique to achieve this, which may be employed in various embodiments, may involve initializing the inner optimizations at their optimum from the previous iteration. Per-item local state may have to be stored and updated to enable such initialization in at least some embodiments. Another technique to speed up the inner optimizations, which may be employed in some embodiments, may involve tuning the termination criteria for the local optimizations: e.g., depending on the specific optimization algorithm used in the outer loop, the inner optimization may only have to be solved to a fairly low tolerance. A hard limit on the number of iterations of the inner optimization may be set in some embodiments, as there may be some items, especially when very large heterogeneous data sets are being dealt with, which may be slow to converge for a given setting of w. In some embodiments, the same optimization algorithm such as L-BFGS may be employed for both the outer (global) optimization and the nested inner (local) optimizations; in other embodiments, different algorithms may be used for the two parts of the problem.

Figure 6:
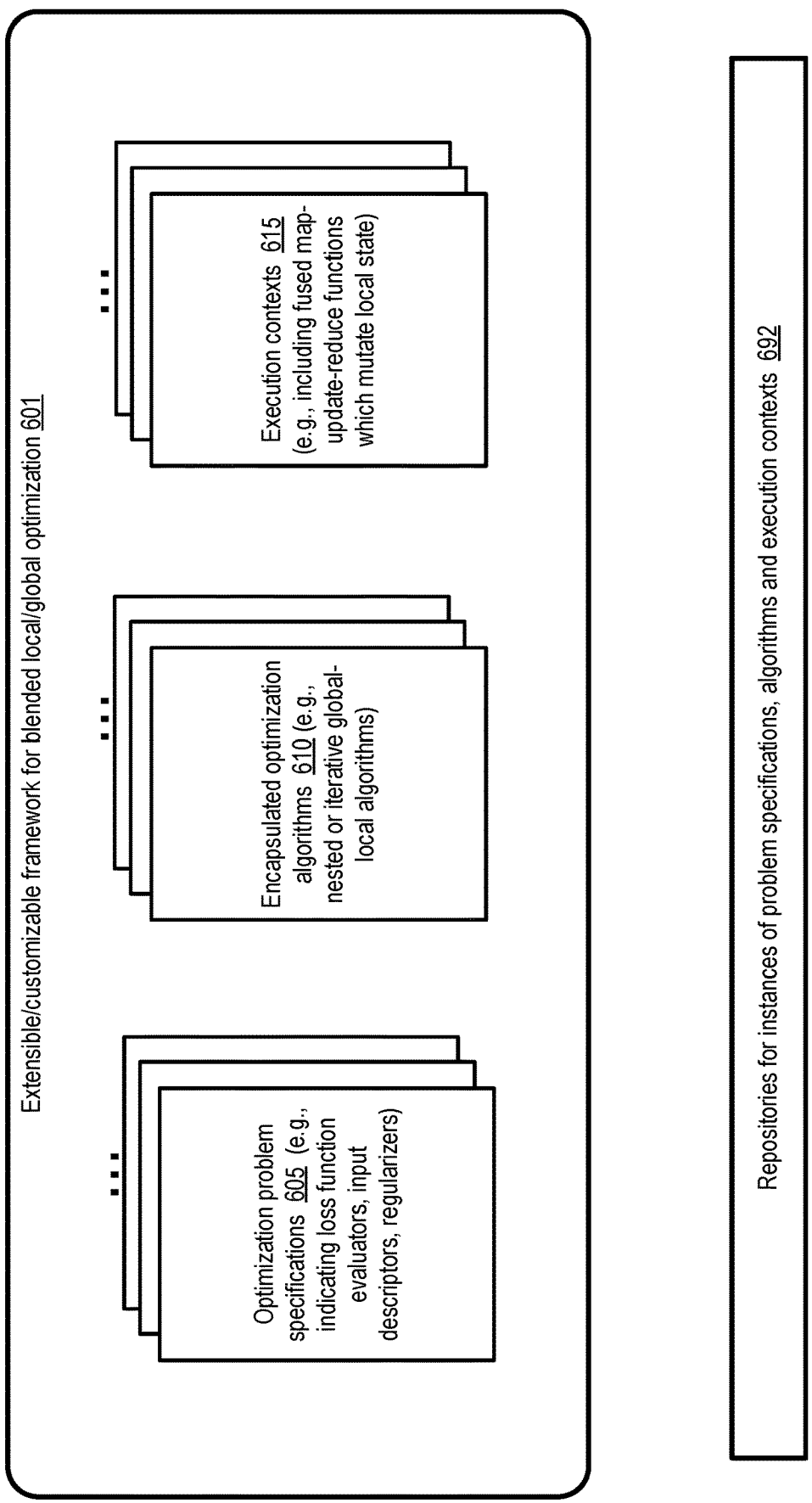
FIG. 6 illustrates example aspects of a flexible software framework for blended global-local optimization, according to at least some embodiments.

As mentioned above, a software framework that can be used to implement the nested and/or alternating optimization approaches may be implemented at the machine learning service. FIG. 6 illustrates example aspects of a flexible software framework for blended global-local optimization, according to at least some embodiments. As shown, framework 601 may define respective programmatic templates or interfaces for optimization problem specifications 605, encapsulated optimization algorithms 610, and execution contexts 615 in the depicted embodiment. Optimization problem specifications 605 may also be referred to as optimization problem descriptors or optimization problem representations in various embodiments. A given instance of an optimization problem specification 601 may indicate, for example, the structure of the problem (e.g., the local and global parameters), an objective function to be optimized, and/or the underlying item descriptors. In at least some embodiments, program code for respective methods to be used to evaluate the objective function with respect to item descriptors may be included in the problem specification instance, and/or program code for evaluating respective regularizers may be included. Instances of the optimization algorithms 610 may implement respective optimization approaches, such as batch gradient descent algorithms, L-BFGS or ADMM, and may be used with execution contexts to interact with distributed data and distributed state information. Implementations of nested global-local algorithms and/or alternating iterative algorithms of the kind discussed above may be included in respective instances of optimization algorithms within the framework in some embodiments. Execution contexts 615 may encapsulate how a given algorithm is actually to be applied to a given set of data, how the distributed state is maintained, and how communication between partitions is to occur. In some embodiments, an instance of an execution context may include program code for various functions such as a fused map-update-reduce function which may be invoked from the algorithm. State information pertaining to items may be mutated by some such fused functions, while details regarding the internal representation or storage of the state information may be encapsulated or hidden from the users of the execution contexts. In some embodiments, a given instance of an execution context may be implicitly or explicitly associated with a set of one or more execution platforms: e.g., some execution contexts may be intended to run optimization algorithms on clusters of multiple servers, while other execution contexts may be intended to run the algorithms on laptops or individual desktops or servers. Multiple instances of each of the three types of entities shown in FIG. 6 may be stored in repositories 692 (e.g., in source code form and/or in executable form) in some embodiments, from which such instances may be retrieved and combined to respond to various types of forecasting requests submitted by clients of the machine learning service or forecaster.

FIG. 7 illustrates examples of software interfaces for which respective implementations may be combined to solve global-local optimization problems, according to at least some embodiments. In the depicted embodiment, by way of example, the interfaces are shown using constructs (such as respective "traits" for problem specifications, optimization algorithms, and execution contexts) of the Scala programming language; in other embodiments, similar software interfaces may be defined using constructs of other programming languages such as Python, Java™, and the like.

In problem specification interface example 705 of the depicted embodiment, the trait GlobalLocalOptProblem includes definitions for three functions or methods evalInstance, evalLocalRegularizer and evalGlobalRegularizer. Concrete implementations of these three functions may be used to evaluate loss functions, local regularizers and global regularizers respectively in various embodiments. The user-defined Instance type may be used to represent features and target values associated with various items. Respective vectors localParams and globalParams may be used to store local and global parameters respectively in the depicted embodiment. The evalInstance function may return values of loss function $L_i$ (w, $v_i$) as well as its derivatives with respect to w and $v_i$ in locations specified by the evalResultBox argument in the depicted embodiment. An instance of the EvalResultBox object type may be allocated by the caller of evalInstance to represent the data structures used for the values of the function and its derivatives in the depicted embodiment. The regularizer evaluation functions may return the values of the corresponding regularizer as well as its derivatives in at least some embodiments.

Optimization algorithm interface example 710 may define the optimization procedure to be used in the depicted embodiment. In order to avoid placing restrictions on how different global-local algorithms may be implemented, a fairly limited set of requirements are indicated with respect to the algorithm interface in the depicted embodiment. Access to various required data types, such as instance state, partition state, execution contexts, and problem specifications may be provided in the depicted embodiment, as indicated by the type statements shown. A minimize method which takes an execution context for manipulating the data and the distributed state associated with a particular problem is included in the trait used for the algorithm. Concrete implementations for a variety of approaches towards distributed optimization, including the nested approach and/or the interleaved approach discussed earlier, may be used in accordance with the trait indicated in example 710 in various embodiments. A concrete implementation may also provide methods, not shown in example 710, for initializing the distributed state and retrieving it from the execution context in various embodiments.

Execution contexts, as indicated in interface example 715, may represent an abstraction through which optimization algorithms interact with the item data and the distributed state in various embodiments. In the depicted embodiment, a concrete implementation of an execution context may include various types of functions familiar to users of distributed processing environments such as those based on Apache Spark or MPI (Message Passing Interface), such as functions used to implement broadcast, map and reduce functionality. In at least some embodiments, these core operations may be extended by allowing item-specific and/or item-group-specific mutable distributed state information to be updated and stored, e.g., during a map step. For example, in the depicted embodiment, a fused map-update-reduce function (mapUpdReduce) may be defined which encapsulates or hides the internal representation of the distributed data and state information from the users. Various operations may be defined on the instance or item level as well as on the item-group or partition level in execution context implementations in some embodiments. This approach may allow partition-level state information to be maintained, as may be required for example for ADMM (alternating direction method of multipliers) style algorithms. Random access to partition elements and their state may be provided in various execution contexts in at least some embodiments. In some embodiments, as mentioned earlier, respective execution context implementations may be associated implicitly or explicitly with respective combinations of execution platforms—e.g., one execution context implementation may be created for Spark clusters, another for single-host execution of algorithms, and so on.

In at least some embodiments, a spectrum of clients with differing levels of expertise with respect to forecasting algorithms may be supported using a software framework of the kind described above. Libraries of numerous concrete implementations of traits or interfaces similar to those indicated in examples 705, 710 and 715 may be stored in a repository of the machine learning service in some embodiments, and some clients may be able to invoke various combinations of the implementations to solve particular forecasting problems, e.g., without having to write source code. For example, pseudo-code 720 shows how, in one embodiment, a particular client may utilize the framework to solve an already-implemented optimization problem (e.g., a logistic regression problem, as indicated by the name LogisticRegressionProblem) on a given data set (indicated by myData) using an already-implemented distributed batch L-BFGS algorithm (as indicated by the name LBFGSOptAlgorithm) with an already-implemented execution context associated with a cluster of servers (as indicated by the name ClusterExecutionContext). Other clients may decide to generate their own customized concrete implementations for problem specifications, global-local algorithms and/or execution contexts in some embodiments, and use the customized implementations to solve their problems.

In general, the concept of learning local versus shared (group-level or global) parameters may be applicable to other types of problems, in addition to the problem of predicting future values of time series. Accordingly, in at least some embodiments, an extensible framework similar to that discussed in the context of FIG. 6 and FIG. 7 may be employed for machine learning problems that are not necessarily directed towards time series forecasting as such. For example, in some embodiments global-local optimization algorithms similar to those discussed above may be used for classification problems, in which observations of a data set to be classified may have some number of observation-specific features and some features shared with other observations.

In at least one embodiment, artificial neural networks may be employed to generate future values of time series elements using the framework discussed above. For example, the evaluation functions indicated in the problem specifications may implement neural networks of various types, including feed-forward and/or recurrent neural networks in at least some embodiments. In some embodiments, a global-local neural network may comprise several layers of artificial neurons, including some number of neurons which collectively first apply a shared global transformation $\delta(.,\varphi)$ to the features $x_{it}$ and global parameters $\varphi$ (analogous to the global parameters w discussed earlier). Then the higher-level features produced by the global transformation may be combined using a local function $\Lambda(.,\theta_i)$, where $\theta_i$ represent local or item-level parameters analogous to the parameters $v_i$ discussed earlier. The following equation may represent the overall output $g_t$ of a global-local neural network model in at least some embodiments:

$$g_t(x_{it},\varphi,\theta_i)=\Lambda(\Gamma(x_{it},\varphi),\theta_i) \qquad (5)$$

Figure 8:
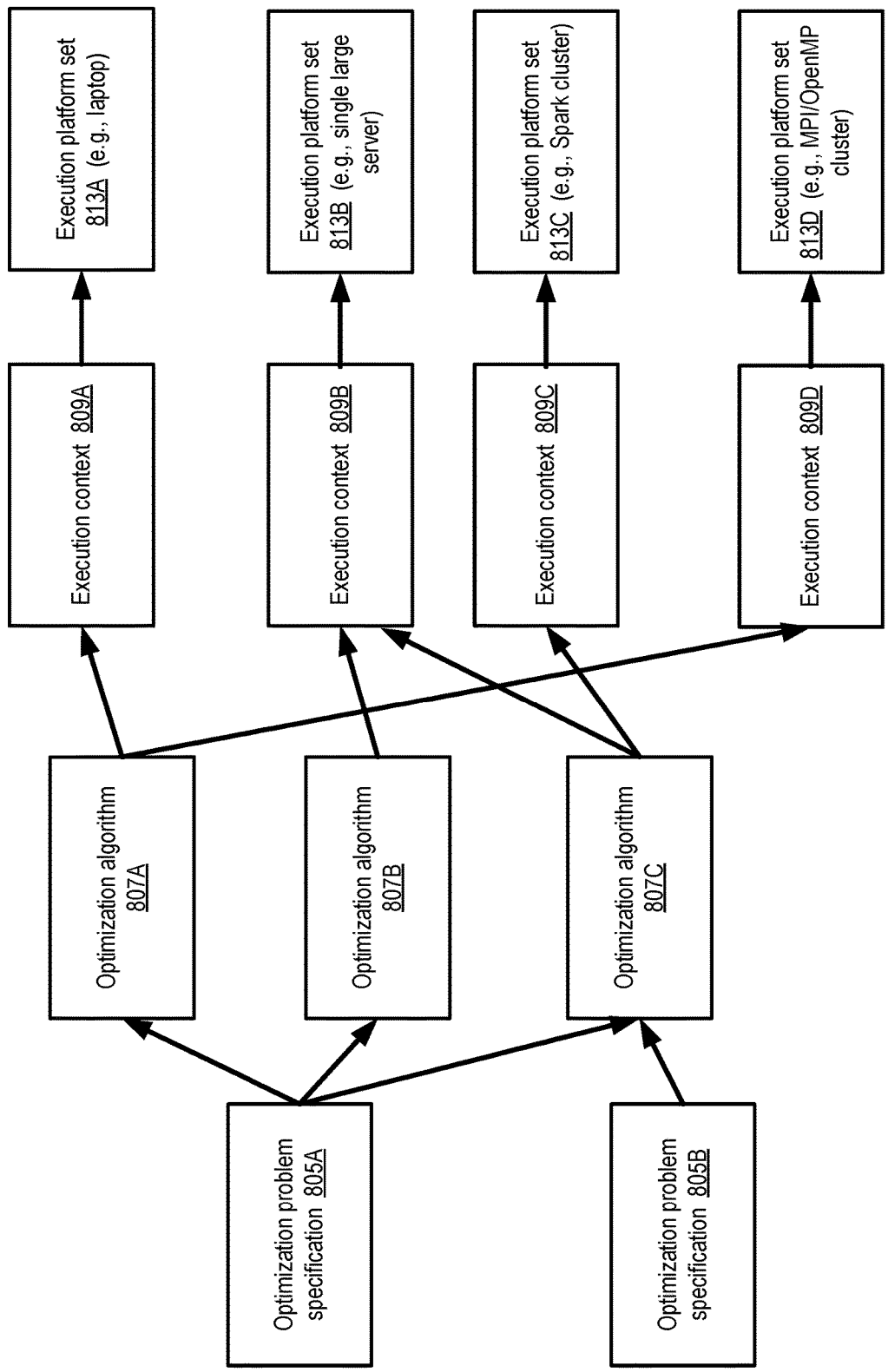
FIG. 8 illustrates examples of the use of multiple optimization algorithms with multiple execution contexts for a given optimization problem, according to at least some embodiments.

FIG. 8 illustrates examples of the use of multiple optimization algorithms with multiple execution contexts for a given optimization problem, according to at least some embodiments. In the depicted embodiment, a client of the machine learning service may, for example use execution context 809A or 809D to run algorithm 807A with respect to a given problem specification 805A. Similarly, execution context 809B may be used in combination with optimization algorithm 807B for problem specification 805A, or execution contexts 809B or 809C may be used in combination with optimization algorithm 807C. With respect to problem specification 805B, algorithm 807C may be used in conjunction with execution contexts 809B or 809C.

A number of different sets of execution platforms 813 may be employed in the depicted embodiment to run the algorithms and/or to generate the forecasts using optimized values of the local and/or global parameters. For example, execution platform 813A, associated with execution context 809A, may comprise a single laptop, while execution platform set 813B associated with context 809B may comprise a single large server in the depicted embodiment. Execution platform set 813C associated with execution context 809C may comprise a Spark cluster of a particular size, while execution platform set 813D associated with execution context 809D may comprise a cluster of MPI or OpenMP (Open multi-processing) cluster. The concrete implementations of the execution contexts 809 may, for example, use the appropriate APIs available at the corresponding set of execution platforms to manage broadcast, map, reduce and other operations, and to distribute data and state information in multi-node environments in various embodiments.

Figure 9:
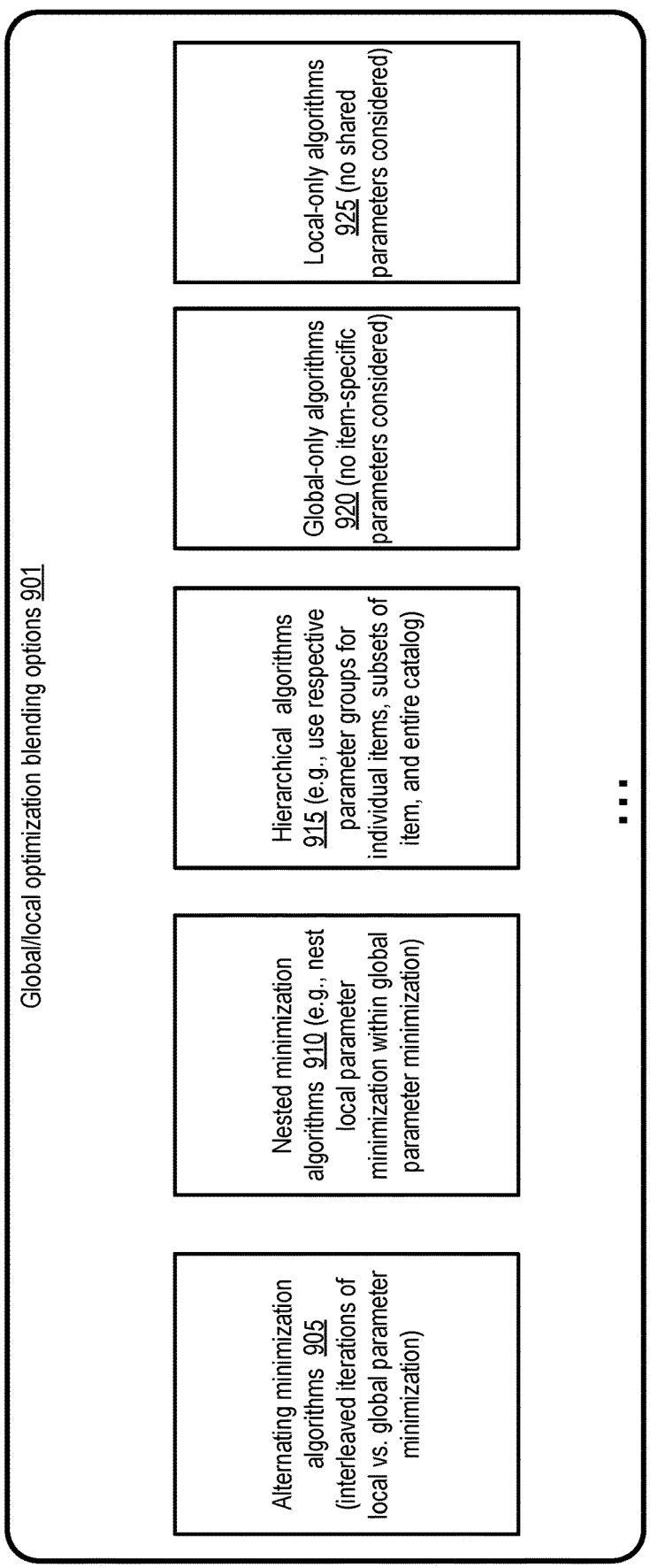
FIG. 9 illustrates examples of distributed approaches which may be used for global-local optimization problems, according to at least some embodiments.

As mentioned earlier, a number of alternatives may be available with respect to optimizing combinations of item-specific and shared parameters at a machine learning service in different embodiments. FIG. 9 illustrates examples of distributed approaches which may be used for global-local optimization problems, according to at least some embodiments. As shown, global-local optimization blending options 901 may include, among others, alternating minimization algorithms 905, nested minimization algorithms 910, hierarchical algorithms 915, global-only algorithms 920 and local-only algorithms 925 in the depicted embodiment.

In the alternating minimization algorithms 905, respective iterations of optimization of global or shared parameters (which keeping values of local parameters fixed) may be interleaved with iterations of optimization of local or item-specific parameters (while keeping values of global parameters fixed) in various embodiments. Optimization operations which are directed towards parameters that are not item-specific may be referred to as non-local optimization operations in various embodiments. In nested minimization algorithms 910, optimization operations for identifying values of local or item-specific parameters may be nested within optimization operations for identifying values of global or shared parameters in various embodiments. In hierarchical algorithms 915, respective sets of parameters (which may include regularization parameters) may be optimized for individual items, groups of items, or the entire catalog of items. The non-local stages of hierarchical algorithms may, for example, include local optimization steps for item-specific parameters, alternated with global hierarchical aggregation steps to re-compute group-specific parameters and global parameters in some embodiments. In global-only algorithms 920, no item-specific parameters may be optimized in the depicted embodiment, while in local-only algorithms 925, only item-specific parameters may be optimized.

FIG. 10a, FIG. 10b, FIG. 11a and FIG. 11b collectively illustrate examples of workload distribution for global-local optimization problems, according to at least some embodiments. In FIG. 10a, an alternating minimization algorithm may be implemented using partition nodes (PNs) 1005A-1005T and a central node (CN) 1010 in the depicted embodiment. Global parameters w labeled 1024 are shared among all the items, while individual items i with demand time series $z_i$ and features $X_i$ 1020 may have associated item-specific parameters $v_i$ 1022. In at least some embodiments, item-specific or local parameters $v_i$ may be minimized, e.g., in parallel iterations 1026 performed on the PNs, while the shared global parameters w may be updated using batch gradient descent iterations interleaved among the local parameter optimization iterations. In such an embodiment, a set of optimization operations S1 performed for an item-specific parameter set I1 on a particular partition node (e.g., an execution platform EP1) may overlap in time at least partially with a different set of optimization parameters S2 performed for a different item-specific parameter set I1 on a different partition node (e.g., an execution platform EP2). After each interleaved global optimization iteration 1028, the updated global parameters w may be broadcast to the PNs in the depicted embodiment. It is noted that multiple PNs and/or the CN may be mapped to a single physical or virtual machine of a cluster in different embodiments; that is, the number of machines or servers used may not necessarily be equal to the number of nodes shown in FIG. 10a. In at least one embodiment, a fused map-reduce-update function similar to that discussed above may be employed for the alternating minimization algorithm shown in FIG. 10a.

In FIG. 10b, a distributed hierarchical optimization algorithm is depicted. Item-specific parameters $v_i$ may be learned at the PNs 1055A-1055T in local learning steps 1076 which may be performed in parallel as in FIG. 10a. In a global hierarchical aggregation step 1078 which alternates with the local learning steps 1076, item-group-specific parameters $w_{gj}$ may be re-computed at group nodes (GNs) 1060A and 1060B, followed by the re-computation of the global parameter vector w at a central node 1070. Iterative map-update-reduce functions similar to those discussed above may also be employed for hierarchical optimization in at least some embodiments. The current versions of the group-level parameter vectors and the global parameter vectors may be broadcast to the PNs 1055 to start the next local iteration.

Figure 11B:
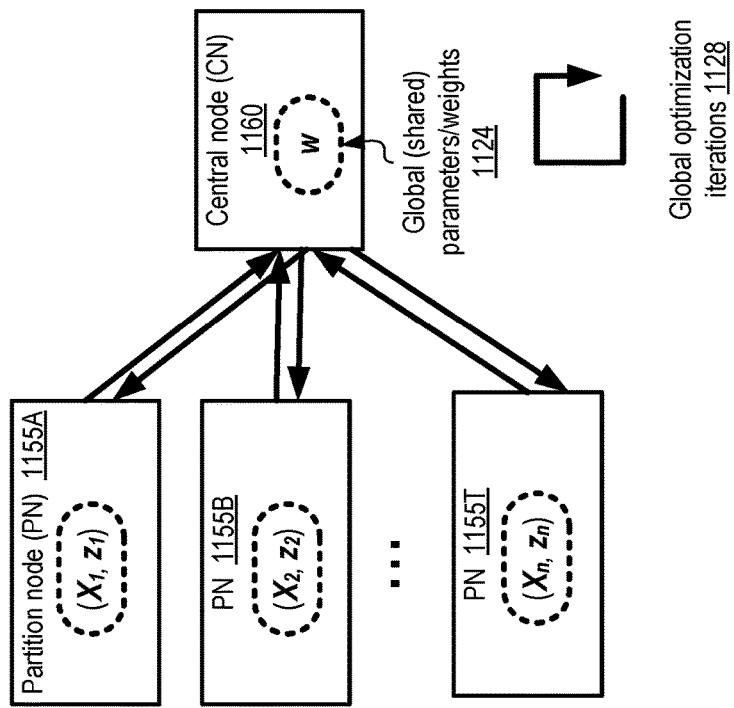
Figure 11A:
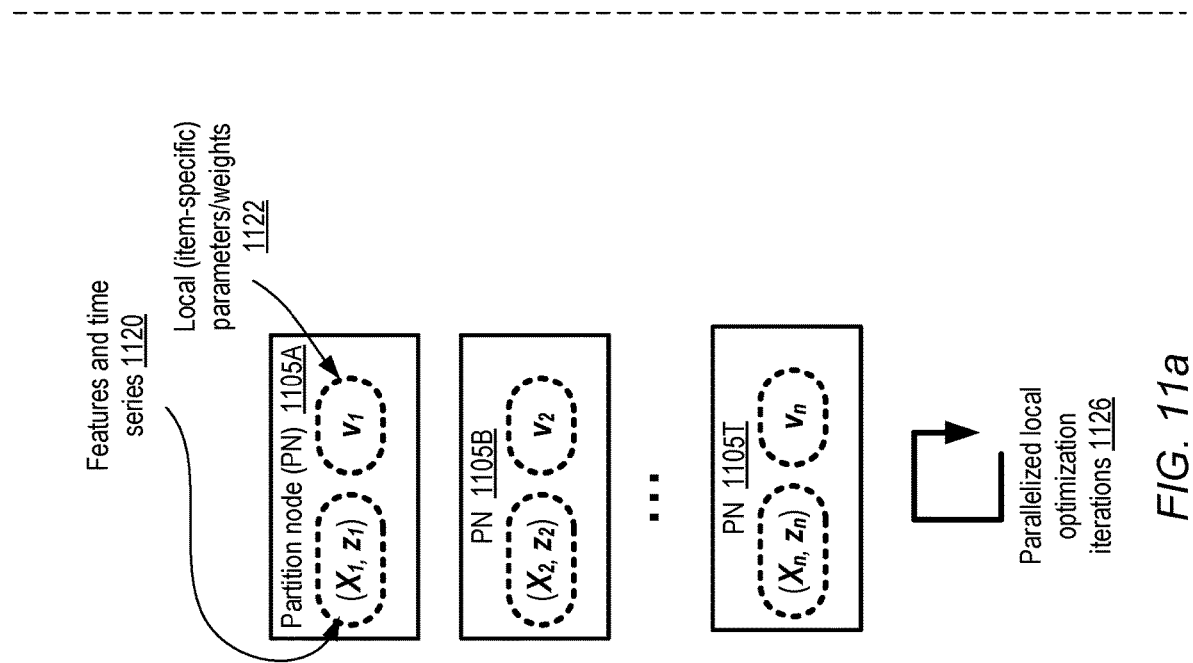

In embodiments in which no shared parameters have to be optimized, the fully-local optimization approach illustrated in FIG. 11a may be employed, in which, in effect, a respective distinct learner may be trained in parallel iterations 1126 for individual items at respective partition nodes 1105 (e.g., 1105A-1105T) that include respective features and time series 1120 and local (item specific) parameters/weights 1122. This approach may be executed with a map operator, in which the learner is given the data associated with an item and learns the parameter vector for that item locally. Such an approach may enable scaling of the forecasting model training to very large data sets in some embodiments, e.g., using maximum likelihood parameter learning in state space models with non-Gaussian likelihood using approximate Bayesian inference.

In embodiments in which no item-specific or group-specific parameters have to be learned, the global-only learning approach indicated in FIG. 11b may be employed. An iterative map-reduce-update function may be used in the depicted embodiment to execute a batch gradient descent. At the beginning of an iteration 1128, the current version of the global parameter vector w 1124 may be broadcast to various partition nodes (PN) 1155, e.g., 1155A-1155T, to each of which a subset of items may be assigned. Next, at each worker node, the sum of the gradients for individual items in the worker's subset of items may be computed in parallel, e.g., using a map operation over the input. Then, a global aggregation may be run at the central node (CN 1160) using a reduce operator in which the gradient contributions are combined. The CN may then compute the next version of the global parameter vector w and start the next iteration.

The set of supported techniques for global-local optimization discussed above may provide several types of technical advantages in at least some embodiments. In some cases, it may be possible to decouple the code base used for the local optimizations (e.g., the operations executed at the partition nodes) from the code base used for shared or global optimization (e.g., the operations executed at the central or group nodes). As a result, the overall effort and cost involved in developing and debugging the algorithms may be reduced in various embodiments, in addition to the performance benefits which may be obtained by parallelizing at least some fraction of the work. Similar software engineering-related benefits may apply to the clean separation of optimization problem specification, global-local algorithm specification and execution context specification made possible by the extensible framework discussed in the context of FIG. 6 and FIG. 7.

Methods for Global-Local Optimization for Time Series Forecasting

Figure 12:
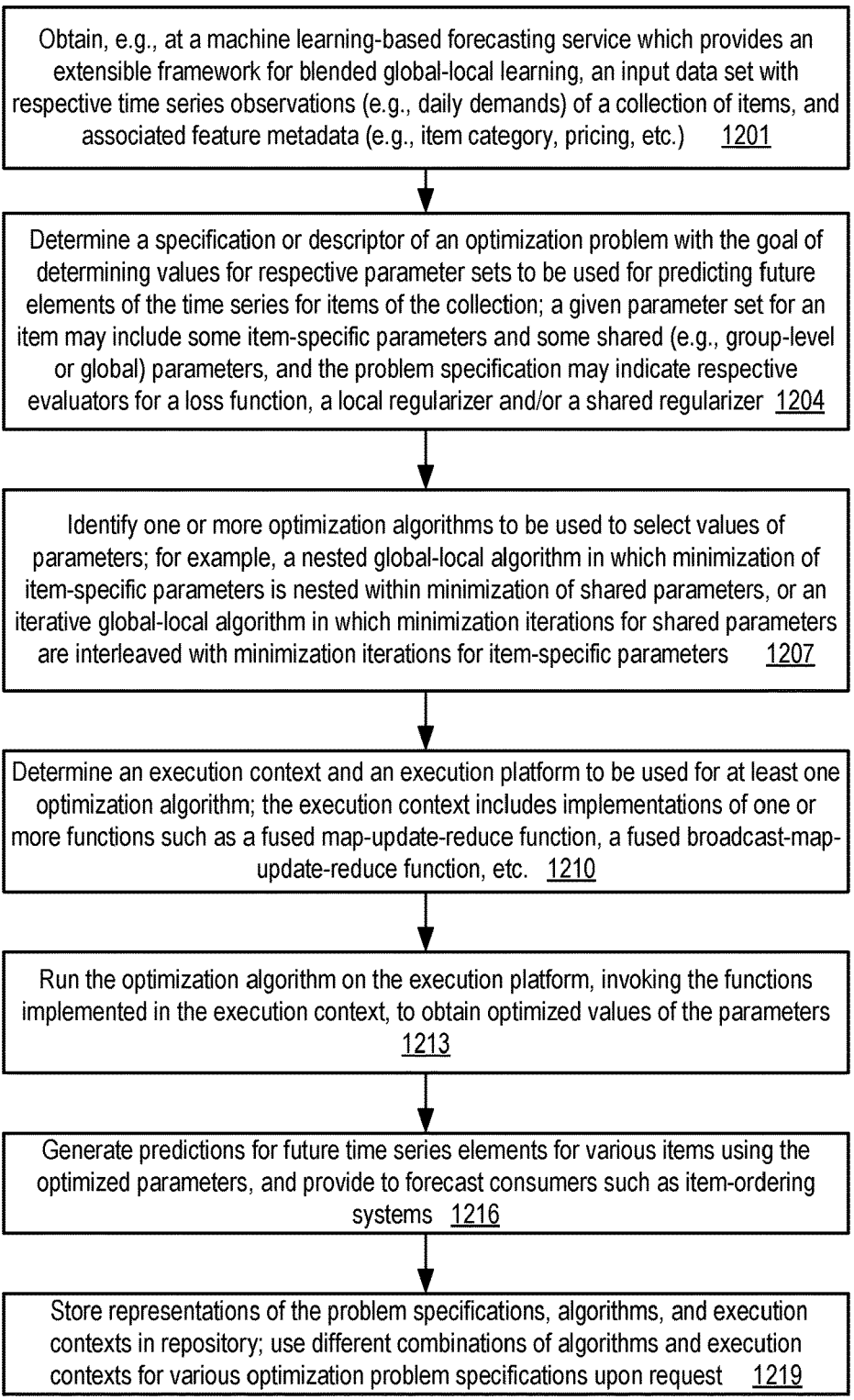
FIG. 12 is a flow diagram illustrating aspects of operations that may be performed to implement global-local optimizations for time series forecasting, according to at least some embodiments.

FIG. 12 is a flow diagram illustrating aspects of operations that may be performed to implement global-local optimizations for time series forecasting, according to at least some embodiments. As shown in element 1201, an input data set with respective time series observations (e.g., daily demands) of a collection of items, and associated feature metadata (e.g., item category, pricing, etc.) may be obtained, e.g., at a machine learning-based forecasting service which provides an extensible framework for blended global-local learning in some embodiments.

The framework may include definitions of several different kinds of interfaces for which concrete implementations (written, for example, in any of a variety of programming languages such as Scala, Java™, Python or the like) may have to be identified in order to learn parameters of a model to be used for making future predictions regarding the time series of one or more items. In accordance with a problem specification interface defined by the framework, a concrete specification or descriptor of a particular optimization problem for items of the collection may be obtained (element 1204). A given parameter set for an item may include some item-specific parameters and some shared (e.g., group-level or global) parameters associated with the features and/or the time series in various embodiments. The concrete problem specification may indicate respective evaluators for a loss function, a local regularizer and/or a shared regularizer in at least some embodiments.

The machine learning service may identify one or more optimization algorithms to be used to select the optimized values of the parameters (element 1207) in the depicted embodiment. For example, a nested global-local algorithm in which minimization of item-specific parameters is nested within minimization of shared parameters may be identified, or an iterative global-local algorithm in which minimization iterations for shared parameters are interleaved with minimization iterations for item-specific parameters may be identified. A number of different algorithms adapted to handle a mix of local and shared parameters may be employed in different embodiments, including for example batch gradient descent algorithms, the L-BFGS algorithm, or ADMM algorithms. In at least one embodiment, the particular global-local algorithm to be employed for a particular problem specification may be indicated by a client of the machine learning service; in another embodiment, the machine learning service may select an algorithm for a given problem from a library of previously-stored algorithms.

In some embodiments, an execution context and an execution platform to be used for an optimization algorithm may be determined at the machine learning service (element 210). The execution context may include implementations of one or more functions such as a fused map-update-reduce function, a fused broadcast-map-update-reduce function, etc., similar to functions whose signatures are indicated in FIG. 7. In at least one embodiment, the particular execution context and/or platform to be employed for a problem specification and an algorithm selected for the problem specification may be indicated by a client of the machine learning service. In another embodiment, the machine learning service may select the execution context and/or platform.

The optimization algorithm may be run on the selected execution platform (element 1213), invoking the functions as implemented in the execution context, to obtain optimized values of the parameters in various embodiments. Predictions for future time series elements for different items may be generated using the optimized values of the parameters, e.g., in response to various specific forecast requests indicating the items and forecast target periods (element 1216) in some embodiments. The generated forecasts may be provided to one or more forecast consumers such as item ordering systems. The machine learning service may store representations of the problem specifications, algorithms, and execution contexts in a growing library within one or more repositories (element 1219). Different combinations of algorithms and execution contexts may be employed for various optimization problem specifications upon request in various embodiments. In some embodiments, the machine learning service may provide tools (e.g., graphical user interfaces or consoles) to enable clients to add program code representing customized concrete implementations of problem specifications, optimization algorithms, and/or execution contexts to the service repository of such artifacts maintained by the service, and/or to request the re-use of existing artifacts from the repository.

Routing of Training Data Subsets

Figure 13:
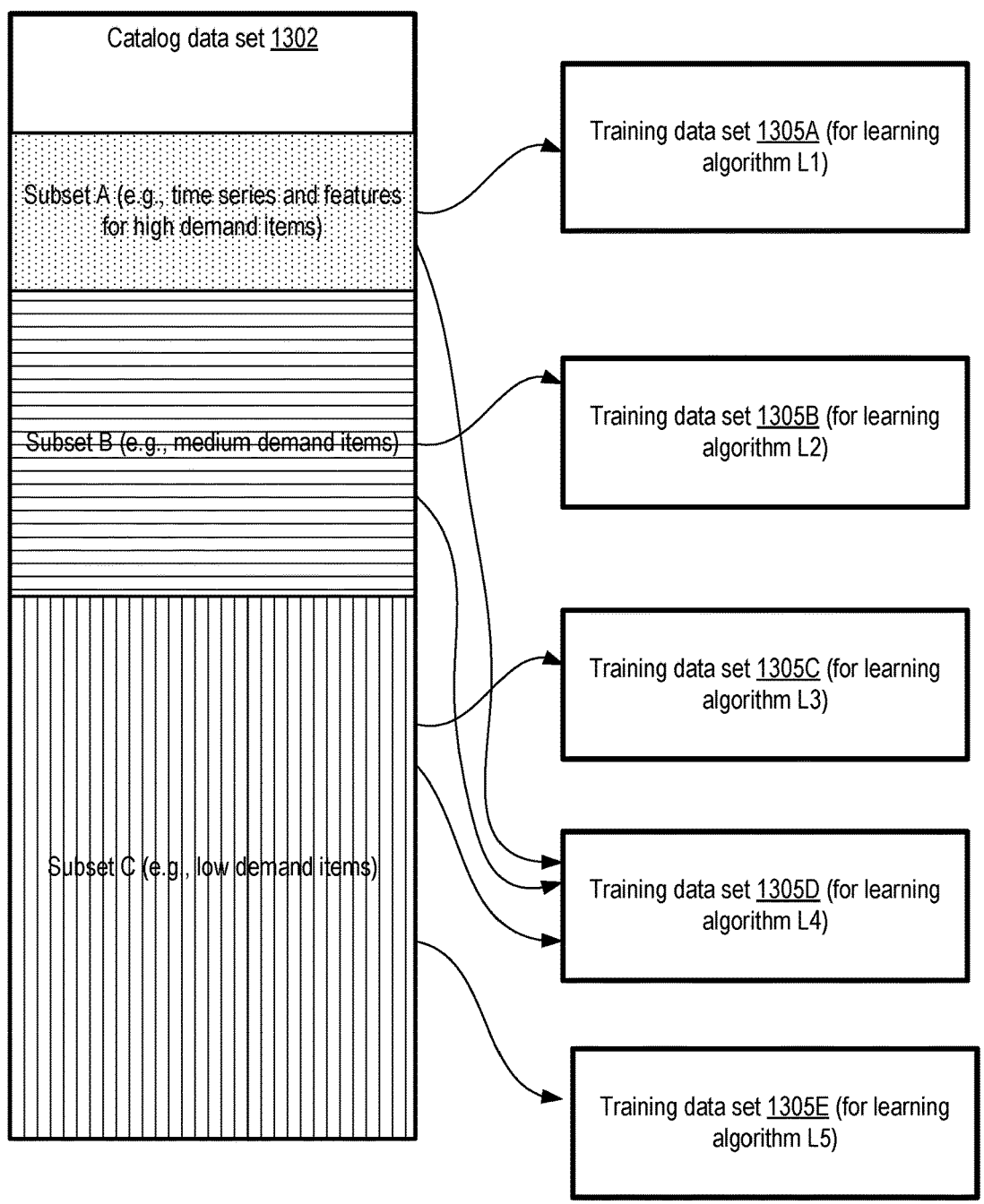
FIG. 13 illustrates an example scenario in which respective subsets of input time series data representing various groups of items may be used to train different learning algorithms, according to at least some embodiments.

As different sets of items of a catalog or inventory may exhibit widely varying demand behavior, it may sometimes be useful to train a variety of forecasting models using respective subsets of input data, and then use the appropriate combination of models to respond to specific forecasting requests. FIG. 13 illustrates an example scenario in which respective subsets of input time series data representing various groups of items may be used to train different learning algorithms, according to at least some embodiments. In the depicted embodiment, an input data set 1302 representing a catalog of items of items may include, for example, subset A comprising high demand items, subset B comprising medium demand items, and subset C comprising low demand items. The items may be classified into the subsets A, B and C based on various metrics such as absolute demand values, cost-weighted demand or price-weighted demand values and the like in different embodiments.

A number of learning algorithms may be identified for predicting demands for items of catalog data set 1302 in the depicted embodiment, and respective training data sets may be extracted from the input data available. For example, for an algorithm L1, a training data set 1305A comprising item descriptors of subset A (high-demand items) may be chosen. For algorithm L2's training data set 1305B, subset B (medium demand items) may be selected, while for training data sets 1305C and 1305E of algorithms L3 and L5 respectively, subset C (low-demand items) may be chosen. Some algorithms may be trained using multiple subsets or all of the input data available in the depicted embodiment—e.g., algorithm L4's training data set 1305D may comprise subsets A, B and C. As discussed below in further detail, the machine learning service may enable clients to provide declarative training specifications in various embodiments, indicating how an input data set may be logically and/or physically partitioned to generate training data for particular algorithms. Using such training specifications, a mix of algorithms that are designed for handling respective types of demand behavior may be trained in different embodiments—e.g., algorithms that are more suitable for intermittent demand values similar to those indicated in FIG. 2 may be trained for some of items, while algorithms that are more suitable for items with high demand on average may be trained for other items. The training of different algorithms using various subsets of the input data may be performed in parallel in some embodiments.

Combining Predictions from Multiple Learning Algorithms

Figure 14:
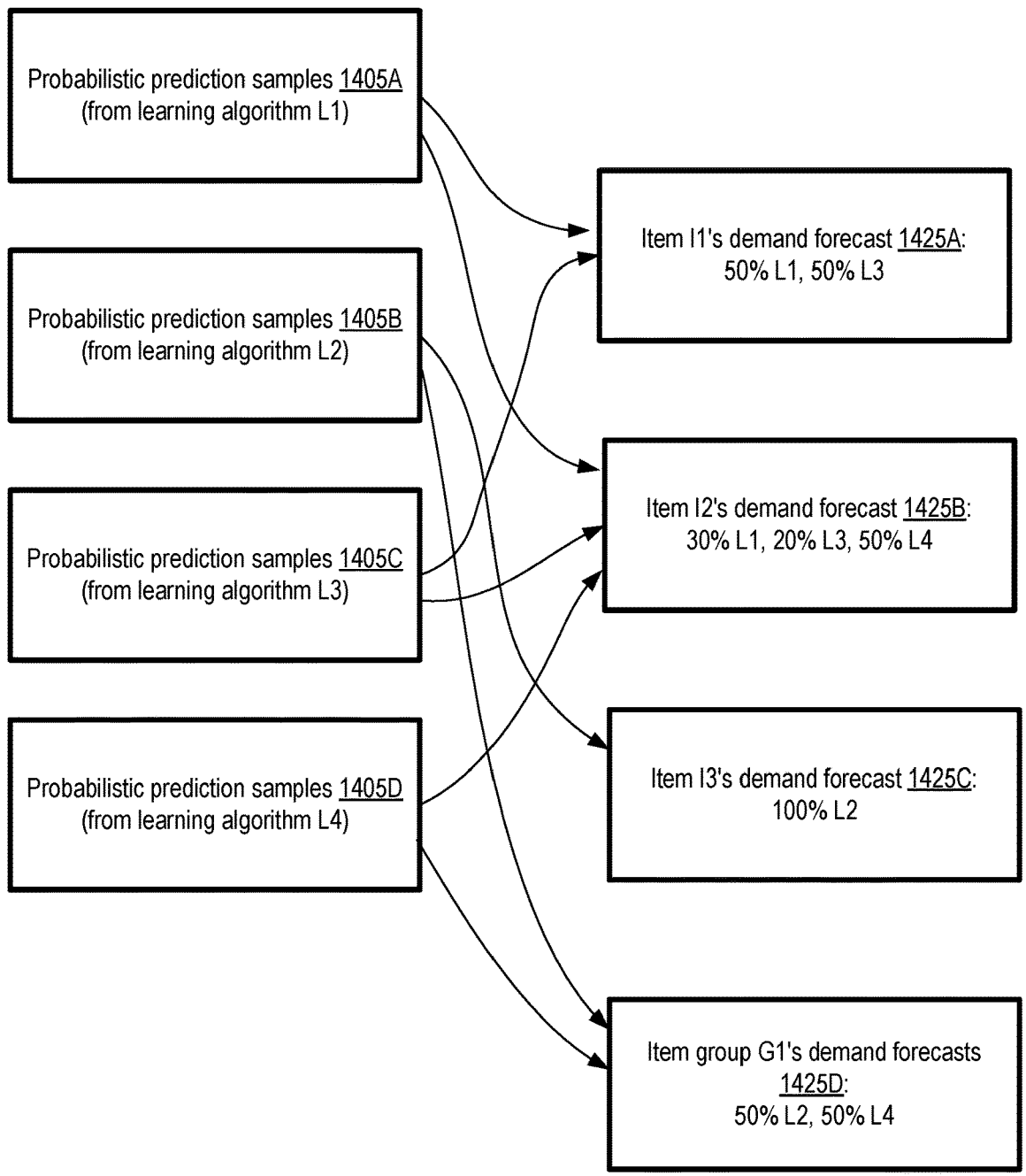
FIG. 14 illustrates an example scenario in which samples of predictions generated by different learning algorithms for a forecast period may be combined for a given item, according to at least some embodiments.

FIG. 14 illustrates an example scenario in which samples of predictions generated by different learning algorithms for a forecast period may be combined for a given item, according to at least some embodiments. In the depicted embodiment, respective demand forecasts 1425A, 1425B, and 1425C are to be generated for items I1, I2, and I3 of an inventory for specified forecasting periods, while demand forecast 1425D is to be generated for a group of items G1 of the inventory. Several different learners may have been trained in the depicted embodiment to generate forecasts for the inventory items, including learning algorithms L1, L2, L3 and L4.

Respective prediction samples 1405A-1404D may be generated by various ones of the algorithms in the depicted embodiment, and aggregated to obtain the desired forecasts. For example, 50% of the future time series values used for item 1's demand forecast 1425A may be obtained from samples 1405A generated using learning algorithm L1, and the remaining 50% may be obtained from samples 1405C generated using learning algorithm L3. Similarly, a mix of 30% L1 samples 1405A, 20% L3 samples 1405C and 50% L4 samples 1405D may be used for forecast 1425B. For forecast 1425C with respect to item I3, 100% of the forecast samples may be obtained from algorithm L2 in the depicted embodiment, while for forecast 1425D with respect to item group G1 a 50%/50% mix of samples from algorithms L2 and L4 may be used. By using combinations of samples from different algorithms as shown, the probability that algorithm-specific prediction errors can significantly influence the final forecasts produced for various items or groups of items may be reduced in various embodiments. At least some of the algorithms may be executed in parallel, e.g., on respective sets of physical or virtual machines, in various embodiments.

Configuration Specifications for Routing and Prediction Aggregation

Figure 15:
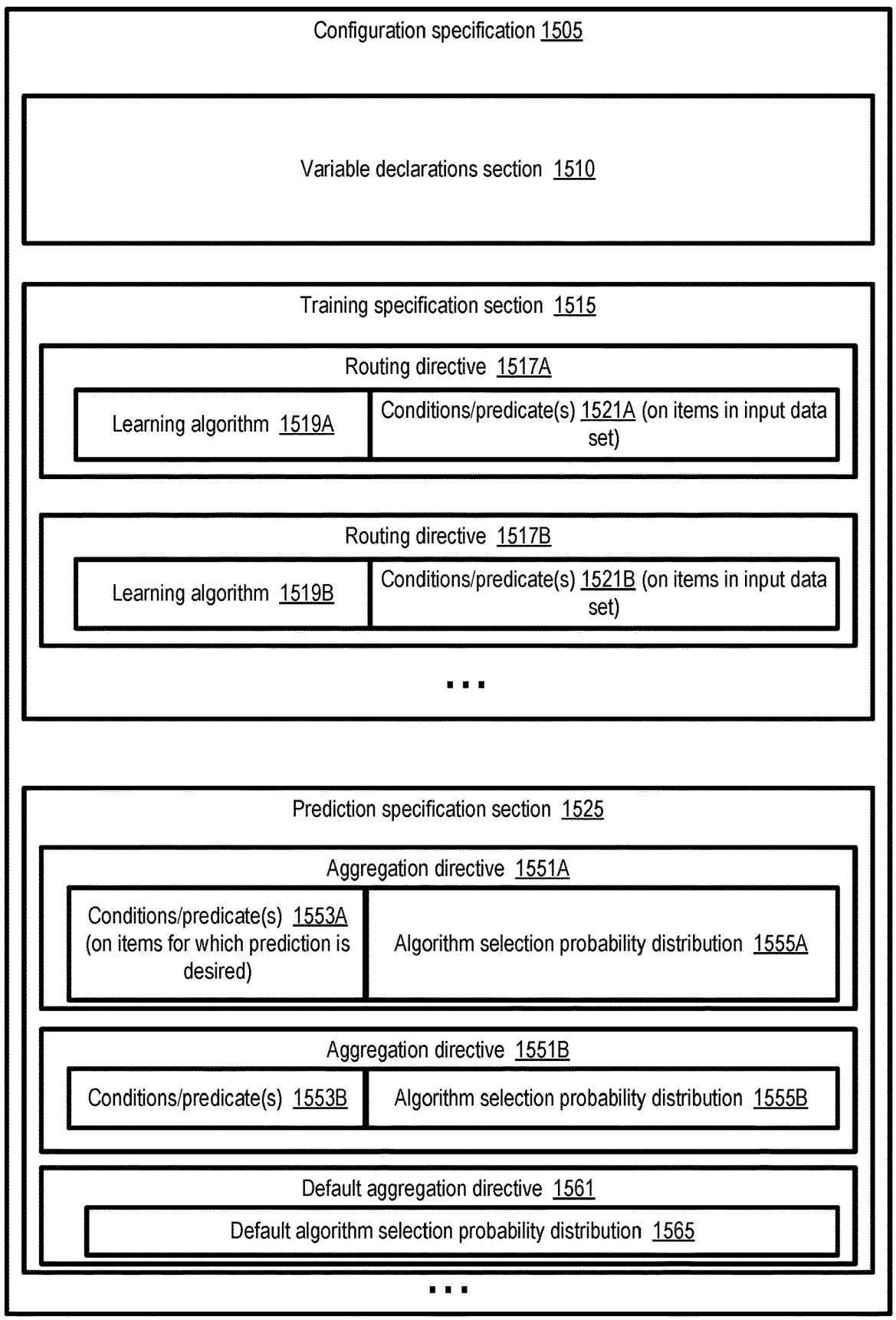
FIG. 15 illustrates an example layout of a configuration specification which may indicate one or more routing directives for training data sets and one or more aggregation directives for combining prediction samples, according to at least some embodiments.

In at least some embodiments, combined declarative specifications may be created by clients of the machine learning service to guide the routing of input data records to train various forecasting algorithms, and to indicate how sample predictions from different algorithms should be combined. FIG. 15 illustrates an example of a configuration specification layout which may indicate one or more routing directives for training data sets and one or more aggregation directives for combining prediction samples, according to at least some embodiments.

In the depicted embodiment, configuration specification 1505 may comprise a variable declaration section 1510, a training specification section 1515 and a prediction specification section 1525. Such a configuration specification may be submitted, for example, to a machine learning service by a client in some embodiments, e.g., using a programmatic tool or an API provided by the service. In other embodiments, respective specifications for training and prediction may be indicated separately, e.g., instead of being combined into a single document or artifact.

Variables declaration section 1510 may comprise respective definitions for a plurality of Boolean or condition variables which may be used to specify predicates for various routing directives and/or prediction aggregation directives in the depicted embodiment. Respective values, with respect to various items, of at least one conditional or Boolean variable indicated in the variables declaration section 1510 may be determined at least in part from contents of the corresponding item descriptors in the depicted embodiment, and predicates in the routing directives and/or aggregation directives may be expressed using such conditional variables. The training specification section 1515 may comprise one or more routing directives 1517 in the depicted embodiment, such as routing directive 1517A and 1517B. A given routing directive 1517 may indicate, with respect to a given learning algorithm 1519 (e.g., 1519A or 1519B), a set of predicates 1521 (expressed, e.g., at least in part using Boolean variable defined in declaration section 1510 in some cases) which may be evaluated to determine whether a given item descriptor of an input data set should be included in the training data for that algorithm 1519. Thus, for example, if a given item descriptor meets criteria specified in predicated 1521A, that item descriptor (including a time series and associated features) may be included in the training data used for algorithm 1519A. Similarly, if a given item descriptor meets criteria indicated by predicates 1521B, that item descriptor may be included in the training data used for algorithm 1519B in the depicted embodiment. It is noted that a given item may be included within training data for multiple algorithms in at least some embodiments using respective routing directives.

Within prediction specification section 1525, respective aggregation directives 1551 (e.g., 1551A and 1551B) may be defined for different items or item groups for which forecasts may be requested in the depicted embodiment. In some embodiments, when a determination is made that a forecast is to be generated for a particular item or group of items, that machine learning service may examine the aggregation directives in the applicable configuration specification 1505 in sequence, searching for the first aggregation directive 1551 whose predicates 1553 (e.g., 1553 or 1553B) match the item or group of items. When such a matching aggregation directive is found, probabilistic forecast samples may be drawn from the trained algorithms indicated in the corresponding probability distribution 1555 (e.g., 1555A or 1555B) and combined to obtain the forecast to be provided in the depicted embodiment. In at least some embodiments, a default aggregation directive 1561 may be indicated in the prediction specification section 1525, indicating a default probability distribution of algorithms 1565 whose results are to be sampled if none of the predicates 1553 indicated in the prediction specification match an item for which a forecast is desired.

FIG. 16 illustrates simple examples of training and prediction specifications, according to at least some embodiments. In the depicted examples, Boolean variables demand_high and demand_medium may be used to indicate respective ranges of observed demand values for a given item. The machine learning service may be able to determine, based on the definitions of demand_high and demand_medium and based on analyzing the demand observation time series for a given item, whether the given item satisfies the demand_high definition, the demand_medium definition, or neither definition in the depicted embodiment. In addition, Boolean variable category_phone may be set to true if the feature metadata pertaining to an item indicates that the item belongs to a phone category. The value of the likely_inactive Boolean variable with respect to a given item may depend on output of a previously trained classifier which predicts whether the item is not likely to sell any more (e.g., because the item may not be produced anymore, even though the machine learning service may not necessarily have information confirming this). In various embodiments, a respective class value of a plurality of categorical class values may be obtained from such classifiers for a given item, and the predicates used in the configuration specification may be expressed at least in part in terms of one or more class values of the plurality of categorical class values. A Boolean variable winter used in the prediction specification may depend on specific dates in the forecasting range for which predictions are desired, rather than on characteristics of individual items in the depicted embodiment. For example, in the Northern hemisphere, winter may be evaluated to True for some number of weeks in the months of December, January and February.

Three learning algorithms may be employed in the embodiment depicted in FIG. 16, and respective training data sets for each algorithm may be generated from an input data set based on the routing directives in example training specification 1610. An algorithm called Zero may constantly predict zero sales, and may be useful primarily for items which fall in the likely_inactive category. A simple baseline learner called Base and a generalized linear model called GLMGlobalLocal may also be used in the depicted scenario. GLMGlobalLocal may, for example, represent a global-local algorithm of the kind discussed earlier, which may use alternating iterations of global parameter optimization and local parameter optimization, local parameter optimization operations nested within global parameter optimization operations, or a hierarchy of parameters corresponding to respective groups of items.

For each of the three learning algorithms, a respective routing directive may be included in the training specification 1610. For example, with respect to GLMGlobalLocal, the "satisfies" predicates indicate that if a given item can be classified as demand_high or demand_medium, the item descriptor for that item should be routed for inclusion in the training set for GLMGlobalLocal. The last part of the GLMGlobalLocal routing directive (comprising "{include=false}") indicates that an item which belongs neither to the demand_high category nor to the demand_medium category is not to be included in the training set for GLMGlobalLocal. The routing directive for the Base algorithm indicates that all items should be included in its training data set, while the routing directive for Zero indicates that no items should be included in the training data set for Zero. (No training may be required for an algorithm like Zero which predicts a constant value as a demand regardless of the item.)

Example prediction specification section 1620 comprises a list of aggregation directives, which may be evaluated for individual items for which predictions are to be generated, and (assuming that forecasts are to be generated on a per-day basis) for every day in the forecasting ranges for the items in the depicted embodiment. (In embodiments in which predictions are to be generated for other forecasting time units such as week-long intervals or hourly intervals, the aggregation directives may also be evaluated once for each appropriate forecasting time unit). The aggregation directives within the prediction specification section may be examined in sequential order at the machine learning service in some embodiments as mentioned earlier. Among the sequentially examined aggregation directives, the first aggregation directive whose condition or predicate (indicated by an explicit or implicit satisfies entry) is satisfied may be used to determine the prediction samples for an item are to be generated for the day being considered in the depicted embodiment. Prediction samples may be obtained from the learning algorithms indicated in the learners clause of the matching aggregation directive, according to the probability distribution or fractions indicated in the learner's clause. Thus, for example, according to the first aggregation directive in section 1620, if a given item is classified as likely_inactive with respect to the day being considered, zero demand may be predicted by using the Zero learner with 100% probability (indicated by the value 1.0). The next aggregation directive indicates that during a time interval corresponding to the winter variable, items which belong to category_phone and have had high demands in the past (as indicated by the demand_high characterization) should get a 50/50 mix of predictions from the Base learner and the GLMGlobalLocal learner (indicated by the 0.5 values). Finally, forecasts for items that have not met the satisfies predicates of any of the aggregation directives may be produced using the default aggregation directive at the end of section 1620, e.g., using samples obtained from the Base learner with 100% probability. The probability distributions for the mix of learning algorithms to be used may indicate the respective fractions of samples which are to be obtained from each of the algorithms and aggregated (e.g., using averaging or percentiles) to produce the output probabilistic forecasts.

It is noted that the winter Boolean variable shown in FIG. 16 represents one example of temporal variables which may be used in various embodiments; other seasonality-related or holiday-related temporal variables (e.g., an xmas variable which may be evaluated to True in some countries for a few weeks prior to Christmas or December 25) may be employed in other embodiments. Aggregation directives whose predicates are expressed in terms of such temporal variables may be used in various embodiments to determine fractions of prediction samples that are to be obtained from various learning algorithms to respond to prediction requests whose targeted forecasting period overlaps at least in part with the time periods represented by the temporal variables.

In at least one embodiment, in addition to implementing the directives indicated in the training and prediction specifications of the kinds discussed in the context of FIG. 15 and FIG. 16, the machine learning service may also provide programmatic interfaces enabling clients to view the assignments of individual items to different training sets and/or to view the probability distributions of learning algorithm prediction samples which were used for specific forecasts. Such interfaces may simplify the tasks of debugging and reporting in various embodiments. In at least one embodiment, item identification information (e.g., item names or unique identifiers) corresponding to individual item descriptors included in the training data set for a specified learning algorithm may be provided using such interfaces—e.g., a response to the logical equivalent of a query "which items were included in the training data set for learning algorithm A1" may be provided programmatically.

In some embodiments, the machine learning service may automatically generate training specifications and/or prediction specifications similar to those discussed in the context of FIG. 15 and FIG. 16. For example, based on an evaluation of the quality of the prediction results obtained using one approach towards training set routing and/or based on other factors such as training-related resource usage measurements, the machine learning service may generate one or more routing directives for a different training specification to be used for a different forecasting problem or a different data set in one embodiment. Existing routing directives may also be modified based on such analysis in some embodiments. Similarly, based on an analysis of the accuracy of previously-generated probabilistic forecasts or other factors, new directives for combining sample predictions from various algorithms may be generated automatically, or existing directives may be modified in at least one embodiment. In effect, in such embodiments, the machine learning service may automatically learn the rules to be used to generate training data sets for various algorithms and/or the rules to be used to combine prediction samples, without having to rely on service customers or other external entities to provide such rules. In at least some embodiments in which multiple learning algorithms are to be trained based on specifications of the kind discussed above, individual learning algorithms may be trained in parallel. Thus, for example, the machine learning service may schedule the training of one learner on one platform using a first subset of the input data, and the training of another learner on a second platform using a second subset of the input data, such that the training times of the two algorithms overlap at least partly. Similarly, with respect to predictions, multiple trained algorithms may be run in parallel (e.g., on different execution platforms) to generate the aggregated forecasts indicated in the prediction specifications in at least some embodiments. Thus, for example, one trained learner may be executed on one platform, generating a first set of sample predictions, while another trained learner is executed on another platform, generating a second set of sample predictions which may be combined with the first set to obtain an aggregated forecast based on the prediction specification being used.

In at least some embodiments, instead of or in addition to being based on characteristics of the items for which a forecast is being generated, decisions as to whether a prediction sample is to be included in a collection of samples which are to be combined to generate the forecast may be based on the values predicted by the corresponding learning algorithm (such as a value of the prediction sample being considered for inclusion, or values predicted earlier by the same algorithm). Consider an example scenario in which, in some embodiment, a given prediction sample PS1 generated by a learning algorithm LA1—comprises a predicted value which does not pass a sanity check for some date in the future for example, the algorithm predicts a demand for 500 items when all the observed demands for the last Y years are for less than 10 items. In such a scenario, PS1 may be excluded from the collection of samples regardless of what the prediction specification being used contains, and/or regardless of whether a prediction specification has been specified at all. In some embodiments, a prediction specification may indicate sanity checks to be performed when making such decisions. In another example scenario, in some embodiments prediction samples may be included or excluded from the collection used for a forecast based on the quality or accuracy of some set of earlier predictions generated using the corresponding algorithms. If a prediction specification indicates, for example, that a 50% mix of samples from algorithms LA1 and LA2 is to be used in one embodiment, and the machine learning service is able to determine that predicted values obtained over some recent time period from algorithm LA2 have been much more accurate than predicted values obtained from LA1, one or more samples from LA1 may not be used for at least some new forecasts (in effect changing the ratio indicated in the specification). Thus, in such embodiments, the factors considered when deciding whether to include a particular prediction sample from a particular learning algorithm in a collection to be combined to generate a probabilistic forecast may include one or more of the values predicted by the learning algorithm. In some embodiments, such factors may be indicated in a prediction specification, while in other embodiments at least some such factors may not be included in a prediction specification.

Methods for Routing Training Data and Prediction Aggregation

Figure 17:
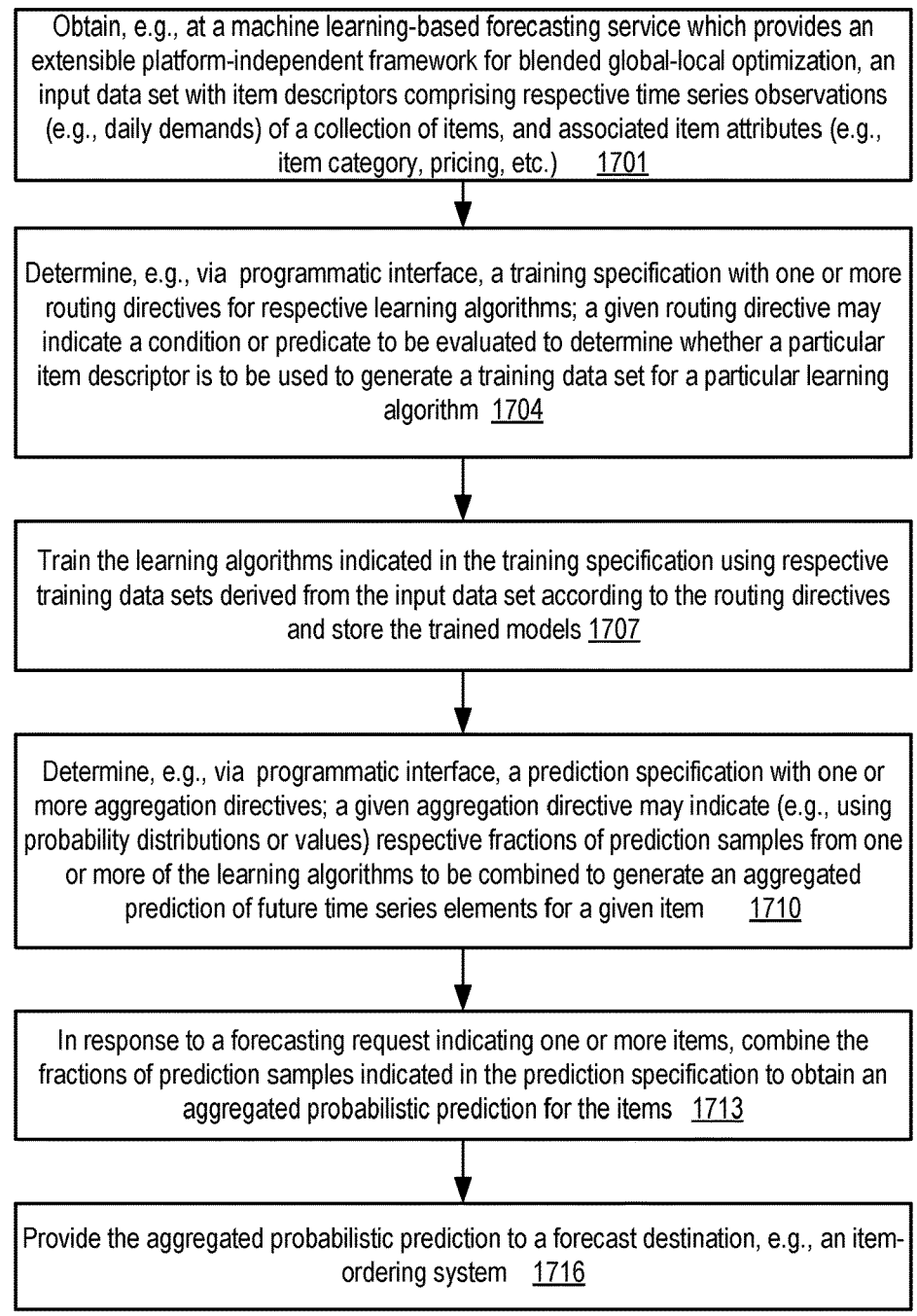
FIG. 17 is a flow diagram illustrating aspects of operations that may be performed to implement training data routing and prediction sample aggregation for a variety of learning algorithms used for forecasting time series values, according to at least some embodiments.

FIG. 17 is a flow diagram illustrating aspects of operations that may be performed to implement training data routing and prediction sample aggregation for a variety of learning algorithms used for forecasting time series values, according to at least some embodiments. As shown in element 1701, an input data set with item descriptors comprising respective time series observations (e.g., daily demands) of a collection of items, and associated item attributes (e.g., item category, pricing, etc.) may be obtained, e.g., at a machine learning-based forecasting service which provides an extensible platform-independent framework for blended global-local optimization algorithms.

A training specification may be determined, e.g., via a programmatic interface, in the depicted embodiment (element 1704), comprising one or more routing directives for respective learning algorithms. A given routing directive may indicate a predicate to be evaluated to determine whether a particular item descriptor of the input data is to be included in a training data set for a particular learning algorithm. Predicates may be expressed using a plurality of conditional or Boolean variables associated with the training specification in various embodiments. Values of some of the conditional variables for a given item may be obtained by analyzing contents of the corresponding item descriptor— e.g., the distribution or absolute values of some or all of the time series elements may be examined to evaluate some variables, while other variables may be defined in terms of item category information included in the item descriptors, and so on. In some embodiments, one or more predicates of the training specification (and/or the prediction specification) may be expressed using elements of the item descriptors (such as item categories) directly, e.g., without defining a Boolean variable as such.

The learning algorithms indicated in the training specification may be trained using respective training data sets derived from the input data set according to the routing directives of the training specification (element 1707) in some embodiments. As mentioned earlier, several of the learning algorithms may be trained in parallel, e.g., using respective training platforms, in at least one embodiment. The trained models may be stored, e.g., at a repository of a machine learning service in some embodiments.

A prediction specification may be determined, e.g., via a programmatic interface, in the depicted embodiment (element 1710), comprising one or more aggregation directives. A given aggregation directive may indicate (e.g., using probability distributions or numerical values) respective fractions of prediction samples from one or more of the learning algorithms to be combined to generate an aggregated prediction of future time series elements for a given item or group of items. In at least one embodiment, the prediction specification and the training specification may be included within a single artifact or document, which may also include respective declarations of variables used to express predicates or conditions in the routing directives and/or the aggregation directives. As mentioned earlier, in at least some embodiments, routing and/or prediction aggregation directives may in some cases be learned automatically, e.g., based on the analysis of the quality, accuracy or resource usage of earlier forecasts. As such, neither the training specifications nor the prediction specifications may necessarily have to be provided to the machine learning service by a client or any other external entity in such embodiments.

In response to a forecasting request indicating one or more items, the machine learning service may combine the fractions of prediction samples indicated in the prediction specification to obtain an aggregated probabilistic prediction for the items (element 1713) in various embodiments. The aggregated probabilistic prediction may be provided to a forecast destination such as an item-ordering system (element 1716) in some embodiments.

It is noted that in various embodiments, some of the operations shown in FIG. 12 and/or FIG. 17 may be implemented in a different order than that shown in the figures, or may be performed in parallel rather than sequentially. Additionally, some of the operations shown in FIG. 12 and/or FIG. 17 may not be required in one or more implementations.

Forecasting Pipeline Dataflow Management

Forecasting workloads may require a number of other operations in addition to training models and combining results from models using techniques such as those discussed above in various embodiments, such as pre-processing, feature transformations, storage of intermediate results, etc. In at least some embodiments, a dataflow management technique which enables various tasks of forecasting pipelines to be modeled in a flexible manner, and identifies opportunities for optimizations such as caching of shared intermediate results, may be implemented at a machine learning service.

In various embodiments, a dataflow of forecasting-related operations may be modeled as a directed acyclic graph (DAG), denoted $G=(V, E)$, where the vertex set V comprises sources and operations, and edges E denote flow of data between vertices. A source may represent a second order function $f_T \rightarrow O$ in such embodiments, where a user-defined first-order function (UDF) $f_T$ produces an output of type O. An operation may comprise a second-order function $I \times f_o \rightarrow O$ in some embodiments, which given an input of type I and a user-defined first-order function $f_o: I \rightarrow O$ produces an output of type O. In at least some embodiments, all the UDFs used in the dataflow may be deterministic and side-effect free. In some embodiments, some number of materialization operations may be supported in the dataflow mechanism, which may include functions I→I with pre-defined side effects, such as persisting a data set in a distributed file system or caching it in memory. Operations may comprise distributed as well as non-distributed computations in some embodiments. The output type of the operations incident to a vertex may match the input type of the vertex in various embodiments.

In at least some embodiments, dataflows may be lazily constructed and eventually executed by a machine learning service runtime system after construction. The runtime system may execute a dataflow by recursively invoking the operations, similar to a depth-first walk of the DAG starting from the leaf vertices. Abstract types Source and Operation of the dataflow mechanism may be extended to implement different operations common to machine learning pipelines in various embodiments, and individual dataflows may be built from type-safe composition of sources and operations. The composability of the dataflows may provide a simple way to create different versions of the pipelines—for example, routing may not be needed for single-learner experiments, so a dataflow that omits the routing step may be defined for such experiments.

A number of automated inspections and optimizations may be supported by the dataflow mechanism in some embodiments. For example, the operator abstraction may detect re-computations of distributed datasets during the depth-first traversal through the DAG, check whether the dataset is currently cached (e.g., by interacting with an underlying cache implementation such as a Spark cache), and record the number of consumptions of uncached operation outputs. Such analysis may enable more intelligent caching decisions regarding intermediate data to be made in various embodiments. Redundant operations such as re-reading input data, re-filtering it based on training specifications and the like may also be identified automatically and eliminated in some embodiments. Common operator subtrees of the DAGs may be identified and executed only once in some embodiments. In various embodiments, performance-critical materialization operators (e.g., for caching) may be added automatically in suitable places in the dataflow. In one approach towards such automated caching insertions, a cache operator may be added after every operator whose output is consumed more than once. In another approach, the input may be down-sampled and pipelining may be disabled during an execution. The operators may be executed locally on the down-sampled output, and execution times and output cardinalities of the optimization candidates (operators with more than one output consumer) may be measured. This profiling information may then be used to identify the most beneficial cache points, and cache operators may be injected into the DAG in some embodiments, e.g., based on a budget derived from the available memory and on output size estimates for the operators.

Figure 18:
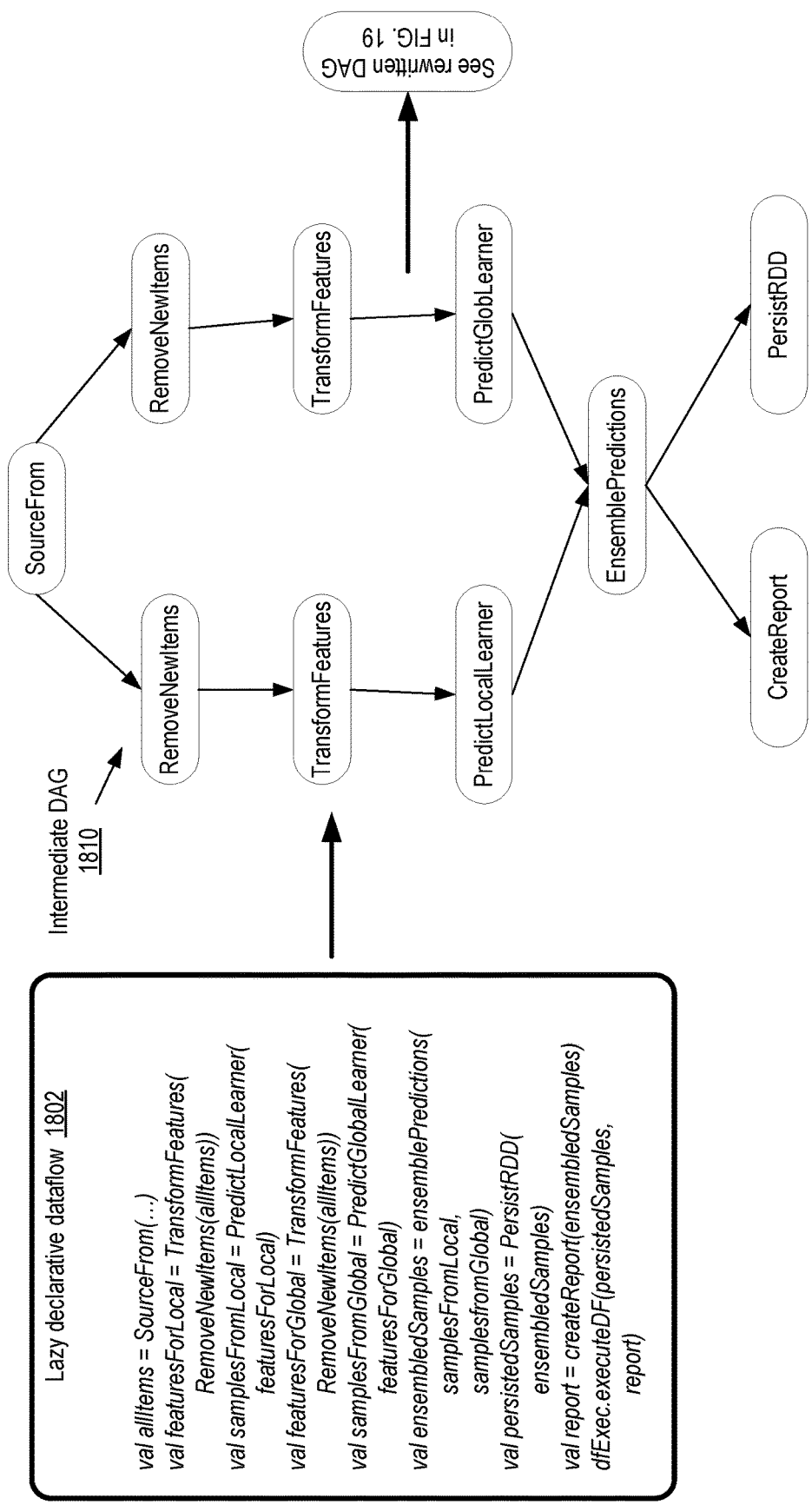
FIG. 18 and FIG. 19 collectively provide an example of dataflow management for forecasting with respect to time series data sets, according to at least some embodiments.
Figure 19:
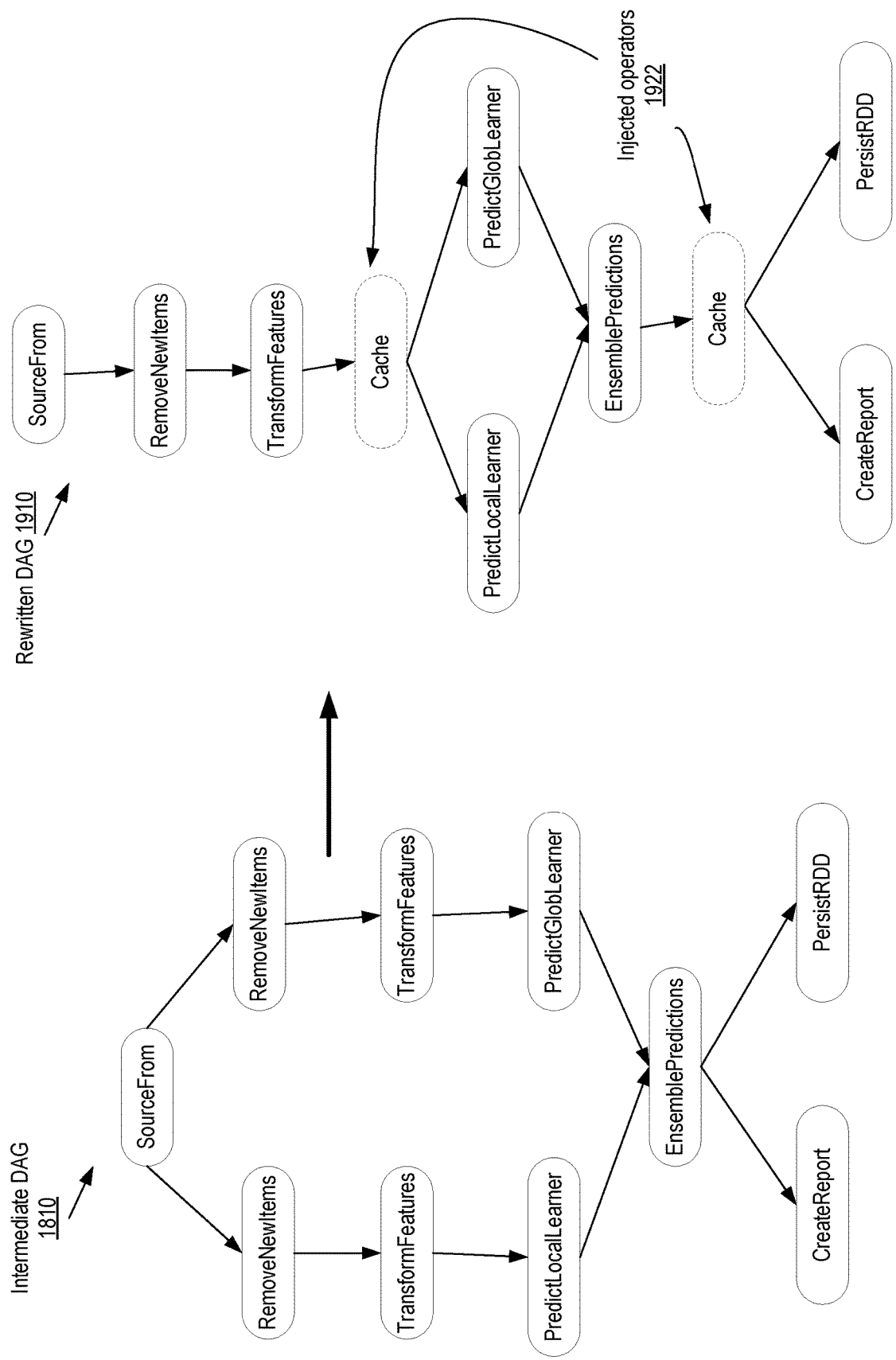

FIG. 18 and FIG. 19 collectively provide a simple example of dataflow management for forecasting with respect to time series data sets, according to at least some embodiments. In the depicted example, lazy dataflow code (expressed in a Scala-like language) 1802 may first be parsed and converted into an intermediate DAG 1810, as indicated in FIG. 18. Next, the DAG may be analyzed and optimized, and the operators of a transformed or re-written version of the DAG 1910 (shown in FIG. 19) may ultimately be executed. In the simple example, a set of items or item descriptors may first be read using the SourceFrom operation. Next, respective pipelines for a local learner and a global learner may be set up. As shown, the RemoveNewItems operator may be used to obtain new items in each case, a TransformFeatures operator may be used to apply feature transformations, and respective sets of predictions may be obtained via the PredictLocalLearner and PredictGlobalLearner operators. The output of both learners is consumed using the EnsemblePredictions operator, which may combine the outputs based on some ensemble definition similar to the aggregation directives discussed above. The combined predictions may be written to stable storage by a PersistRDD operator and a report may be generated using a CreateReport operator. In accordance with the dfExec.executeDF invocation, the dataflow may be executed.

The dataflow code 1802 may be converted into the intermediate DAG 1810 before optimization opportunities are identified in the depicted embodiment. As sub-graphs for both learners share the operators SourceFrom→RemoveNewItems→TransformFeatures, these may be merged into a single instance in re-written DAG 1910, whose output may be consumed by both learners. The system may also apply a simple cache point injection strategy in the depicted embodiment—e.g., a respective cache operator may be injected after operators whose output is read more than once and may therefore be re-computed, including the TransformFeatures and EnsemblePredictions operators. The optimized DAG 1910 comprising the merged operators and the injected operators 1922 may be executed by the machine learning service in the depicted embodiment.

Provider Network Environment

Figure 20:
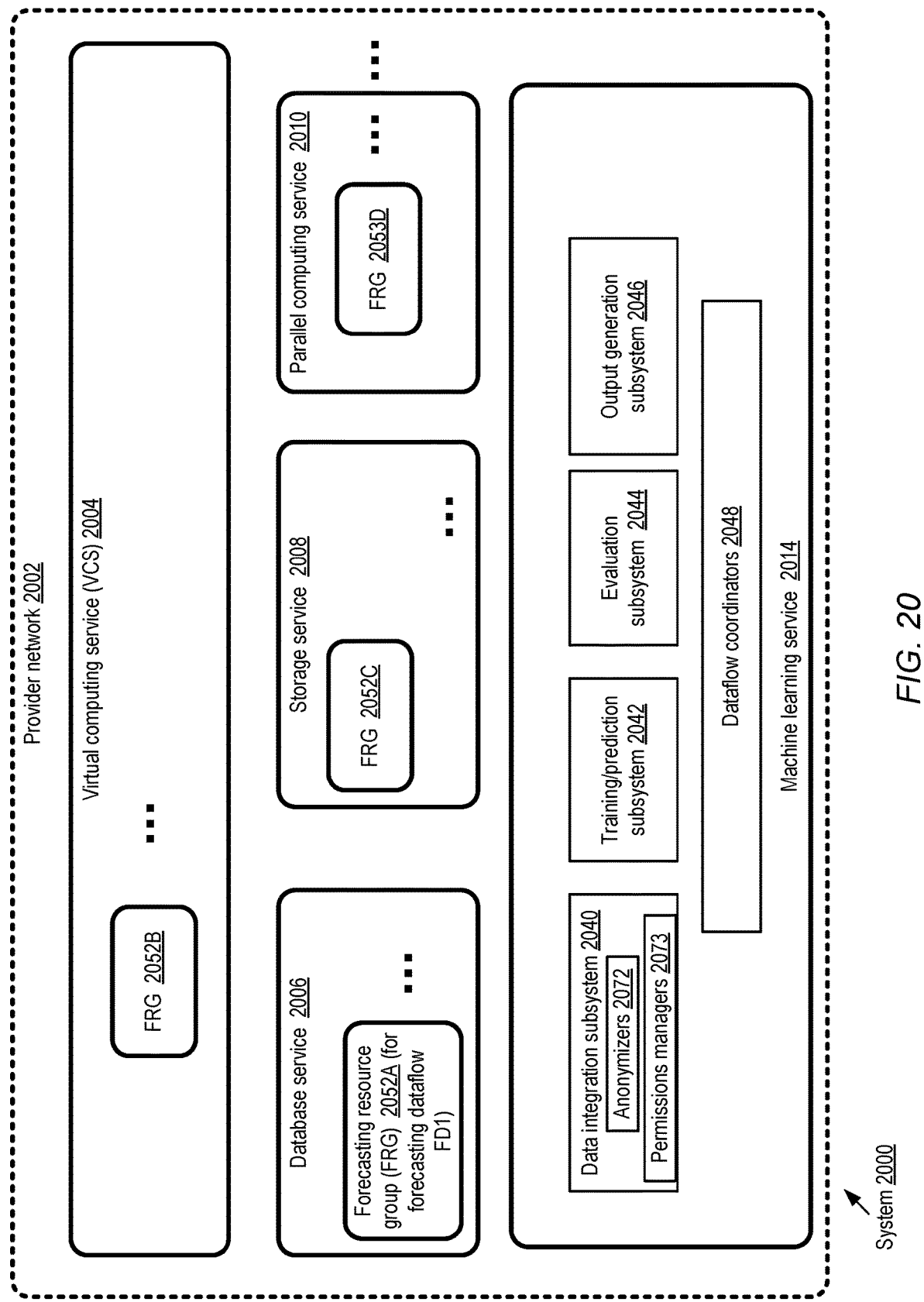
FIG. 20 illustrates a provider network environment in which a machine learning service for generating time series forecasts may be implemented, according to at least some embodiments.

FIG. 20 illustrates a provider network environment in which a machine learning service for generating time series forecasts may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 2002 in the depicted embodiment may include, for example, a virtual computing service 2004, a database service 2006, a storage service 2008, a parallel computing service 2010, and a machine learning service 2014. As shown, the machine learning service 2014 may comprise one or more dataflow coordinators 2048, a data integration subsystem 2040, training/prediction subsystem 2042, evaluation subsystem 2044 and an output generation subsystem 2046 which may collectively be used to implement pipelines similar to those discussed in the context of FIG. 1 using the dataflow techniques discussed above. Each of the services of provider network 2002 may expose respective sets of programmatic interfaces to its clients in the depicted embodiment. Some of the services of a provider network may utilize resources of other services in various embodiments. For example, with respect to a particular forecasting dataflow FD1, respective sets of resources referred to as forecasting resource groups (FRGs) 2052A, 2052B, 2052C and 2052D of database service 2006, virtual computing service 2004, storage service 2008 and parallel computing service 2010 may be used.

The database service may be used, for example, to store various reports produced in the dataflow, the storage service may be used for storing the input data and various intermediate results, and the remaining two services may be used for performing various computation steps.

In embodiments in which a machine learning service 2014 is implemented at a provide network 2002, it may be used to solve forecasting (and other) problems associated with a variety of problem domains—e.g., for item demand forecasting for a variety of organizations which may specialize in different product mixes, financial forecasts, medical forecasts, and the like. As a result, diverse input data may be made available to the machine learning service by different sets of clients. In some such embodiments, one or more of the clients may at least in principle be willing to contribute their data sets (as long as the data is suitably anonymized or obfuscated to ensure that privacy-related problems are avoided) to improve the overall quality of the forecasting methods used at the service. In one such embodiment, the data integration subsystem 2040 of a machine learning service may comprise subcomponents such as anonymizers 2072 and/or permissions managers 2073 to implement privacy policies for those clients who are willing to share their data and/or other artifacts. In some embodiments, the algorithms employed at one or more stages of a forecasting pipeline may be improved over time by using input data associated with different customers and/or different problem-domains—e.g., training data sets from different sources may be used for various learning algorithms. It is noted at least in some embodiments that the anonymizers 2072 and/or permissions managers 2073 need not necessarily be implemented as part of the data integration subsystem of the machine learning service—instead, for example, a permissions management service of the provider network may be used, and/or anonymization tools external to the data integration subsystem may be used. In at least some embodiments, clients of the machine learning service may be able to indicate, e.g., via personalized settings interfaces or via other programmatic interfaces, whether any of their data sets may be used to enhance service functionality, and if so, which data sets are to be used for such purposes, the manner in which the data sets are to be obfuscated or anonymized, etc.

Use Cases

The techniques described above, of utilizing various features of a machine-learning service to generate probabilistic forecasts for demand for various kinds of items may be extremely useful in a number of scenarios. The inventories of many retailers, including Internet-based retailers, may often include large numbers of relatively infrequently-sold items such as shoes, luggage, clothing, various luxury items, and the like, as well as some items that sell much more frequently. The time required to replenish supplies of various items may vary—some orders for the items may be fulfilled within a few days, while others may take weeks or months. The flexible and extensible framework for global-local optimization, together with the routing and prediction aggregation specifications and the dataflow management techniques discussed above may enable predictions of demand over various future periods with high confidence levels to be generated in a timely manner, without requiring excessive amounts of compute power or storage. The forecasts produced may be used as input to a number of automated systems, including but not limited to order management systems, discount/promotion planning systems, facilities planning systems, or product placement planning systems for physical (e.g., walk-in) retail locations. Decoupling the local and global aspects of the algorithms, and separating the specifications of the optimization problems from the algorithms and the execution contexts, may lead to cleaner software implementations overall, potentially reducing the amount of development and debugging effort required to obtain high-quality forecasts.

Illustrative Computer System

Figure 21:
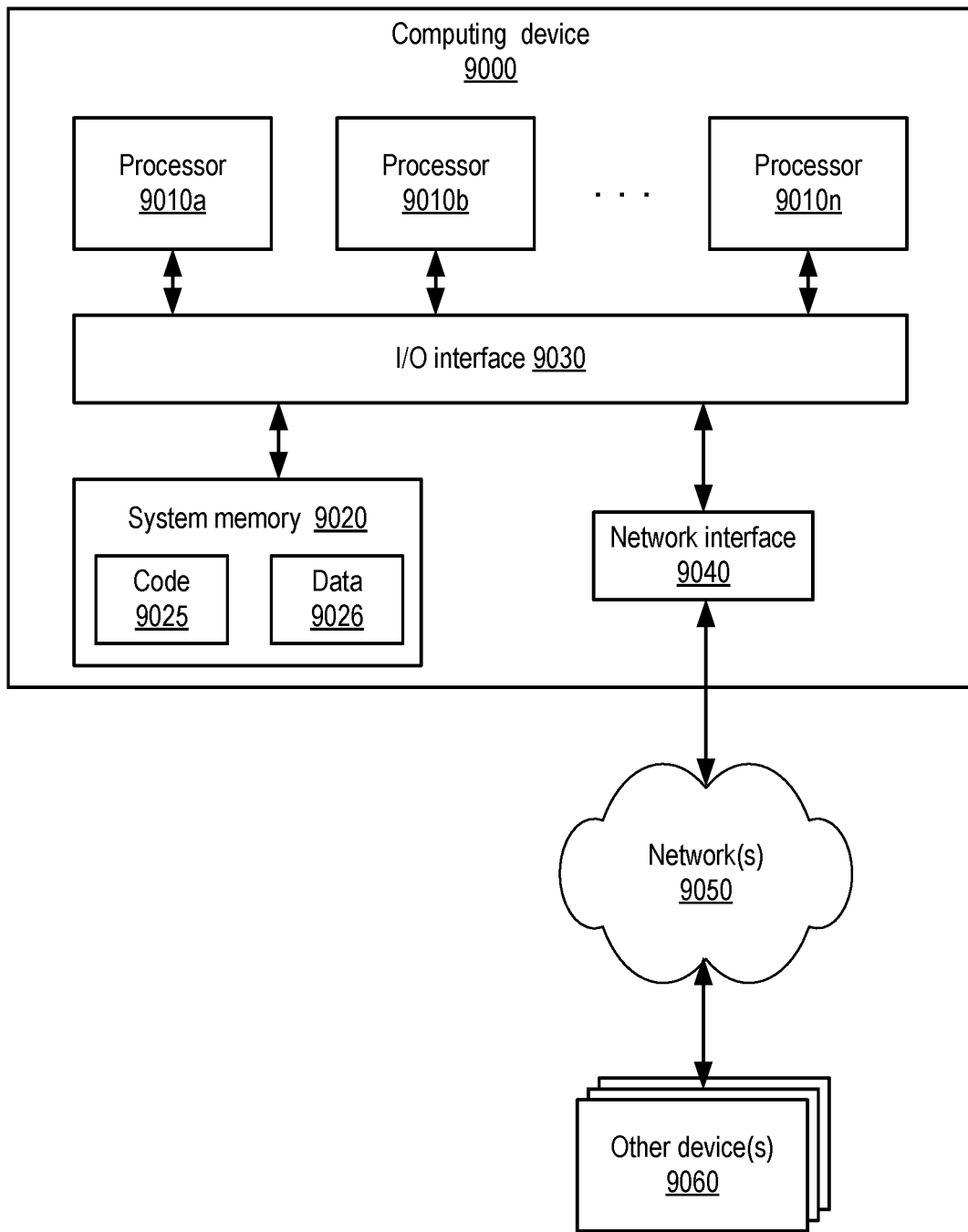
FIG. 21 is a block diagram illustrating an example computing device that may be used in at least some embodiments.

In at least some embodiments, a server that implements a portion or all of one or more of the technologies described herein, including various components of a machine learning service or a forecaster may include a general-purpose computer system that includes or is configured to access one or more computer-accessible media. FIG. 21 illustrates such a general-purpose computing device 9000. In the illustrated embodiment, computing device 9000 includes one or more processors 9010a-9010n coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 20, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 20 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 21 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a network-accessible machine learning service;
   wherein the one or more computing devices are configured to:
   identify a first input data set comprising respective item descriptors associated with respective ones of a plurality of items, wherein a first item descriptor of the respective item descriptors comprises (a) a first time series of observations associated with a first item of the plurality of items and (b) one or more additional attributes of the first item, including an item category to which the first item belongs;
   obtain, via one or more programmatic interfaces, a training specification comprising one or more routing directives indicating respective predicates to be evaluated to determine which item descriptors of the first input data set are to be included in respective training data sets for training respective ones of a plurality of learning algorithms indicated in the training specification;
   evaluate the predicates indicated by the one or more muting directives with respect to the item descriptors of the first input data set to form the respective training data sets from the first input data set, wherein the respective training data sets include at least some differences in which portions item descriptors of the first input data set are included in the respective training data sets;
   provide different ones of the training data sets to train respective ones of the plurality of learning algorithms as indicated in the training specification;
   obtain, via the one or more programmatic interfaces, a prediction specification comprising one or more aggregation directives, wherein a particular aggregation directive of the one or more aggregation directives indicates, with respect to a particular prediction period:
      a first percentile of prediction samples to be obtained from the first learning algorithm for one or more items of the plurality of items that satisfy an aggregation predicate, and
      a second percentile of prediction samples to be obtained from a second learning algorithm for the one or more items,
   wherein the prediction specification is obtained prior to applying the first and second learning algorithms to obtain predictions for the first and second items such that the first and second percentiles are predetermined and the aggregation predicate is predetermined; and store a probabilistic prediction of a future value corresponding to the first time series, wherein the probabilistic prediction is obtained at least in part by combining the first and second percentiles of prediction samples in accordance with the prediction specification.

2. The system as recited in claim 1, wherein another aggregation directive of the one or more aggregation directives indicates a third predicate, wherein the third predicate is expressed in terms of a temporal variable representing a first forecasting period, wherein in accordance with the other aggregation directive, a third percentile of prediction samples are to be obtained from the first learning algorithm to respond to a prediction request whose targeted forecasting period overlaps at least in part with the first forecasting period.

3. The system as recited in claim 1, wherein the one or more computing devices are configured to:

obtain, with respect to one or more of the item descriptors, a respective class value of a plurality of categorical class values from a classifier, wherein the first predicate is expressed at least in part in terms of one or more class values of the plurality of categorical class values.

4. The system as recited in claim 1, wherein the one or more computing devices are configured to:

evaluate one or more prediction results corresponding to a second input data set; and generate, based at least in part on said evaluating, at least one routing directive to be used to generate another training data set.

5. The system as recited in claim 1, wherein the one or more computing devices are configured to:

provide, via a programmatic interface, item identification information corresponding to individual item descriptors included in the training data set for a particular learning algorithm of the plurality of learning algorithms.

6. A method, comprising:

performing, by one or more computing devices:

identifying a first input data set comprising a plurality of item descriptors, individual ones of the item descriptors associated with different respective items of a plurality of items, wherein the individual item descriptors of the first input data set comprise respective time series of observations associated with respective items of the plurality of items;

obtaining a training specification comprising one or more routing directives indicating respective predicates to be evaluated to determine respective portions of the item descriptors of the first input data set to be included in respective training data sets for training respective ones of a plurality of learning algorithms indicated in the training specification, wherein the training specification is obtained prior to forming the respective training data sets from the first input data set such that the predicates are predetermined;

after obtaining the training specification, evaluating the predicates indicated by the one or more routing directives with respect to individual ones of the item descriptors of the first input data set to form the respective training data sets from the first input data set to determine which individual ones of the item descriptors to include in different ones of the training data sets, wherein the respective training data sets include at least some differences in which item descriptors of the first input data set are included in the respective training data sets;

providing different ones of the training data sets to train respective ones of the plurality of learning algorithms as indicated in the training specification; and storing one or more of the trained learning algorithms.

7. The method as recited in claim 6, further comprising performing, by the one or more computing devices:

generating a probabilistic prediction of a future value corresponding to the first time series, wherein the probabilistic prediction is obtained at least in part by combining a first prediction sample from a first learning algorithm and a second prediction sample from a second learning algorithm of the plurality of learning algorithms.

8. The method as recited in claim 7, further comprising performing, by the one or more computing devices:

obtaining a prediction specification comprising one or more aggregation directives, wherein a particular aggregation directive of the one or more aggregation directives indicates, with respect to a particular prediction period, a first percentile of prediction samples to be obtained from the first learning algorithm for one or more items which satisfy a different predicate, and a second fraction Percentile of prediction samples to be obtained from the second learning algorithm for the one or more items that satisfy the different predicate, wherein said generating the probabilistic prediction comprises combining respective prediction samples from the first learning algorithm and the second learning algorithm in accordance with the prediction specification.

9. The method as recited in claim 8, wherein another aggregation directive of the one or more aggregation directives indicates a particular predicate, wherein the particular predicate is expressed in terms of a temporal variable representing a first forecasting period, wherein in accordance with the other aggregation directive, a third percentile of prediction samples are to be obtained from the first learning algorithm to respond to a prediction request whose targeted forecasting period overlaps at least in part with the first forecasting period.

10. The method as recited in claim 8, wherein the prediction specification comprises an ordered set of aggregation directives including a first aggregation directive followed by a second aggregation directive, the method further comprising performing, by the one or more computing devices:

searching the aggregation directives of the prediction specification in a sequential order to identify an aggregation directive whose predicate is satisfied by an item for which a prediction has been requested.

11. The method as recited in claim 6, further comprising performing, by the one or more computing devices:

obtaining definitions of one or more condition variables associated with the first input data set, wherein a value, with respect to the first item, of a particular conditional variable of the one or more condition variables is based at least in part on contents of the first item descriptor, and wherein one of the predicates is expressed using the one or more conditional variables.

12. The method as recited in claim 6, further comprising performing, by the one or more computing devices:

initiating execution of a classifier to obtain, with respect to individual ones of the item descriptors, a respective class value of a plurality of categorical class values, wherein one of the predicates is expressed at least in part in terms of one or more class values of the plurality of categorical class values.

13. The method as recited in claim 6, wherein the first item descriptor indicates an item category to which the first item belongs, wherein one of the predicates is expressed at least in part in terms of one or more item categories including the item category.

14. The method as recited in claim 6, further comprising performing, by the one or more computing devices:
   determining, based at least in part on evaluating one of the predicates, that at least a portion of a first item descriptor is to be included in the training data set for a first learning algorithm; and
   determining, based at least in part on evaluating another predicate indicated in a different routing directive of the training specification, that at least a different portion of the first item descriptor is to be included in the training data set for a different learning algorithm of the plurality of learning algorithms.

15. The method as recited in claim 6, further comprising performing, by the one or more computing devices:
   evaluating one or more prediction results corresponding to a second input data set; and
   generating, based at least in part on said evaluating, at least one routing directive to be included in another training specification.

16. The method as recited in claim 6, further comprising performing, by the one or more computing devices:
   identifying a first execution platform to be used to execute a first learning algorithm of the plurality of learning algorithms;
   identifying a second execution platform to be used to execute a second learning algorithm of the plurality of learning algorithms; and
   initiating respective executions of the first and second learning algorithms on the first and second execution platforms, wherein the execution of the first learning algorithm overlaps at least in part in time with the execution of the second learning algorithm.

17. A non-transitory computer-accessible storage medium storing program instructions that when executed on one or more processors cause the one or more processors to:
   determine that a forecast of respective values of one or more time series are to be generated, wherein individual ones of the time series are associated with respective items;
   obtain a prediction specification comprising one or more aggregation directives indicating, with respect to a particular prediction period of the forecast:
      a first percentile for prediction samples to be obtained from a first learning algorithm for a first item of the respective items which satisfies a first predicate, and a second percentile for prediction samples to be obtained from a second learning algorithm for the first item, and
      a third percentile for prediction samples to be obtained from one of the first learning algorithm or the second learning algorithm for a second item of the respective items which satisfies a second predicate,
      wherein the prediction specification is obtained prior to applying the first and second learning algorithms to obtain predictions for the first and second items such that the first, second and third percentiles and the first and second predicates are predetermined;
   obtain and combine the first percentile of prediction samples from the first learning algorithm and the second percentile of prediction samples from the second learning algorithm in accordance with the obtained prediction specification to determine a first probabilistic prediction for the first item, and obtain the third percentile of prediction samples from one of the first learning algorithm or the second learning algorithm to determine a second probabilistic prediction for the second item in accordance with the obtained prediction specification, such that the first probabilistic prediction for the first item and the second probabilistic prediction for the second item are based on different percentiles of prediction samples from the first learning algorithm and the second learning algorithm; and
   store the first probabilistic prediction as a future value of a first time series associated with the first item and the second probabilistic prediction as a future value of a second time series associated with the second item.

18. The non-transitory computer-accessible storage medium as recited in claim 17, wherein the program instructions when executed on one or more processors cause the one or more processors to:
   obtain a training specification comprising one or more routing directives, wherein a first routing directive of the one or more routing directives indicates a routing predicate to be evaluated to determine whether at least a portion of an input data set is to be included in a training data set for the first learning algorithm; and
   utilize the training specification to identify the training data set for the first learning algorithm.

19. The non-transitory computer-accessible storage medium as recited in claim 17, wherein another aggregation directive of the one or more aggregation directives indicates a third predicate, wherein the third predicate is expressed in terms of a temporal variable representing a first forecasting period, wherein in accordance with the other aggregation directive, a fourth percentile of prediction samples is to be obtained from the first learning algorithm to respond to a forecast request whose targeted forecasting period overlaps at least in part with the particular prediction period.

20. The non-transitory computer-accessible storage medium as recited in claim 17, wherein the prediction specification comprises an indication of a default learning algorithm to be used for generating a forecast for a particular item which does not satisfy one or more predicates indicated in the prediction specification.

21. The non-transitory computer-accessible storage medium as recited in claim 17, wherein the first time series represents demand observations for the first item, wherein the first probabilistic prediction of the future value comprises a particular probabilistic demand forecast, wherein the program instructions when executed on one or more processors cause the one or more processors to:
   transmit a representation of the particular probabilistic demand forecast to one or more of: (a) an automated ordering system, wherein the automated ordering system is configured to generate one or more orders for one or more items based at least in part on the particular probabilistic demand forecast, (b) a discount planning system, (c) a facilities planning system, (d) a promotions planning system, or (e) a product placement planning system for a physical store.

22. The non-transitory computer-accessible storage medium as recited in claim 17, wherein the program instructions when executed on one or more processors cause the one or more processors to:
   determine, based at least in part on one or more factors, whether to include a particular prediction sample in a collection of prediction samples to be combined to generate the probabilistic prediction of the future value of the second time series, wherein the particular prediction sample is obtained from a particular learning algorithm, and wherein the one or more factors include at least one value predicted by the particular learning algorithm.

* * * * *